United States Patent
Doe et al.

(10) Patent No.: US 12,553,765 B1
(45) Date of Patent: Feb. 17, 2026

(54) PULSED STRAIN GAUGE TOPOLOGIES

(71) Applicant: Amazon Technologies, Inc., Seattle, WA (US)

(72) Inventors: Kenneth Edward Doe, Carnation, WA (US); Jacob Drewniak, Seattle, WA (US); Paul Mark Michalczuk, Bainbridge Island, WA (US); Alan Akiyoshi Nonaka, Seattle, WA (US); Chelsea Olson, Auburn, WA (US); Sergio Alfredo Phan Lung Li, Lake Forest Park, WA (US); Robert M. Riggs, Winthrop, WA (US)

(73) Assignee: Amazon Technologies, Inc., Seattle, WA (US)

( * ) Notice: Subject to any disclaimer, the term of this patent is extended or adjusted under 35 U.S.C. 154(b) by 483 days.

(21) Appl. No.: 18/056,340

(22) Filed: Nov. 17, 2022

(51) Int. Cl.
*G01G 21/22* (2006.01)
*G01G 21/23* (2006.01)
*G01G 23/36* (2006.01)

(52) U.S. Cl.
CPC ............. *G01G 21/22* (2013.01); *G01G 21/23* (2013.01); *G01G 23/362* (2013.01)

(58) Field of Classification Search
CPC ..... G01G 21/22; G01G 221/23; G01G 23/362
USPC ............................................................ 177/1
See application file for complete search history.

(56) References Cited

U.S. PATENT DOCUMENTS

| | | | | |
|---|---|---|---|---|
| 4,238,784 A * | 12/1980 | Keen | ...................... | G01R 17/00 341/126 |
| 4,294,322 A * | 10/1981 | Nishiyama | ............. | G01G 23/37 177/DIG. 3 |
| 5,254,992 A * | 10/1993 | Keen | .................... | G01D 3/0365 341/126 |
| 5,982,205 A * | 11/1999 | Vallancourt | .......... | G11C 27/026 327/95 |
| 6,344,773 B1 * | 2/2002 | Sevastopoulos | ... | H03H 11/1291 327/558 |
| 7,790,992 B1 * | 9/2010 | Abbruscato | ........ | G01G 23/3735 177/244 |

FOREIGN PATENT DOCUMENTS

| | | | |
|---|---|---|---|
| CN | 1017799269 | * 8/2010 | |
| EP | 1113249 A2 | * 7/2001 | ......... G01G 23/3707 |

* cited by examiner

*Primary Examiner* — Jacques M Saint Surin
(74) *Attorney, Agent, or Firm* — Eversheds Sutherland (US) LLP

(57) ABSTRACT

Systems, devices, and methods are provided for pulsed strain gauge topologies. A weight sensor assembly may comprise one or more load cells for receiving excitation pulses during a first state period of a duty cycle, sample and hold (S/H) circuitry connected to the one or more load cells that holds analog measurement signals from the one or more load cells, first filtering circuitry connected to the S/H circuitry for processing the analog measurement signals and producing a DC level signal, an amplification system connected to the filtering circuitry, for amplifying the DC level signal, second filtering circuitry connected to the amplification system for filtering power line noise, and analog-to-digital (ADC) circuitry connected to the second filtering circuitry. Examples of load cells described herein include full-bride load cells (FBLCs) and half-bridge load cells (HBLCs).

15 Claims, 14 Drawing Sheets

200A

Hi Z Low Pass and Common Mode Filter

200B

Low Z Notch Filter

200C

Waveshaping Circuit for Excitation Pulses

PULSED STRAIN GAUGE TOPOLOGIES

BACKGROUND

Retailers, wholesalers, and other product distributors typically maintain an inventory of various items that may be ordered, purchased, leased, borrowed, rented, viewed, and so forth, by clients or customers. For example, physical stores maintain inventory in customer accessible areas, such as in a shopping area, and customers can pick items from inventory and take them to a cashier for purchase, rental, and so forth. Likewise, an e-commerce website may maintain inventory in a fulfillment center. When a customer orders an item, the item is picked from inventory, routed to a packing station, packed, and shipped to the customer.

Many physical stores also maintain inventory in a storage area, fulfillment center, or other facility that can be used to replenish inventory located in the shopping areas or to satisfy orders for items that are placed through other distribution pathways (e.g., e-commerce). Other examples of entities that maintain facilities holding inventory include libraries, museums, rental centers, and so forth. In each instance, for an item to be moved from one location to another, it is picked from its current location and transitioned to a new location. It is often desirable to monitor quantity of inventory at various places within the facility.

In many cases, electronic monitoring systems may be located throughout a storage area, fulfillment center, or other facility and utilized to monitor the quantity of inventory at various places within the facility. In many cases, it is desirable to reduce or even eliminate the reliance of electronic monitoring systems on power outlet. While electronic monitoring systems can instead rely on battery power as a power source, batteries are eventually drained and may need to be replaced or recharged. Accordingly, there is a present desire to improve the power consumption of electronic monitoring systems, thereby enabling them to be used for longer periods of time and reducing the frequency at which maintenance or servicing is needed, etc.

Figure 1:
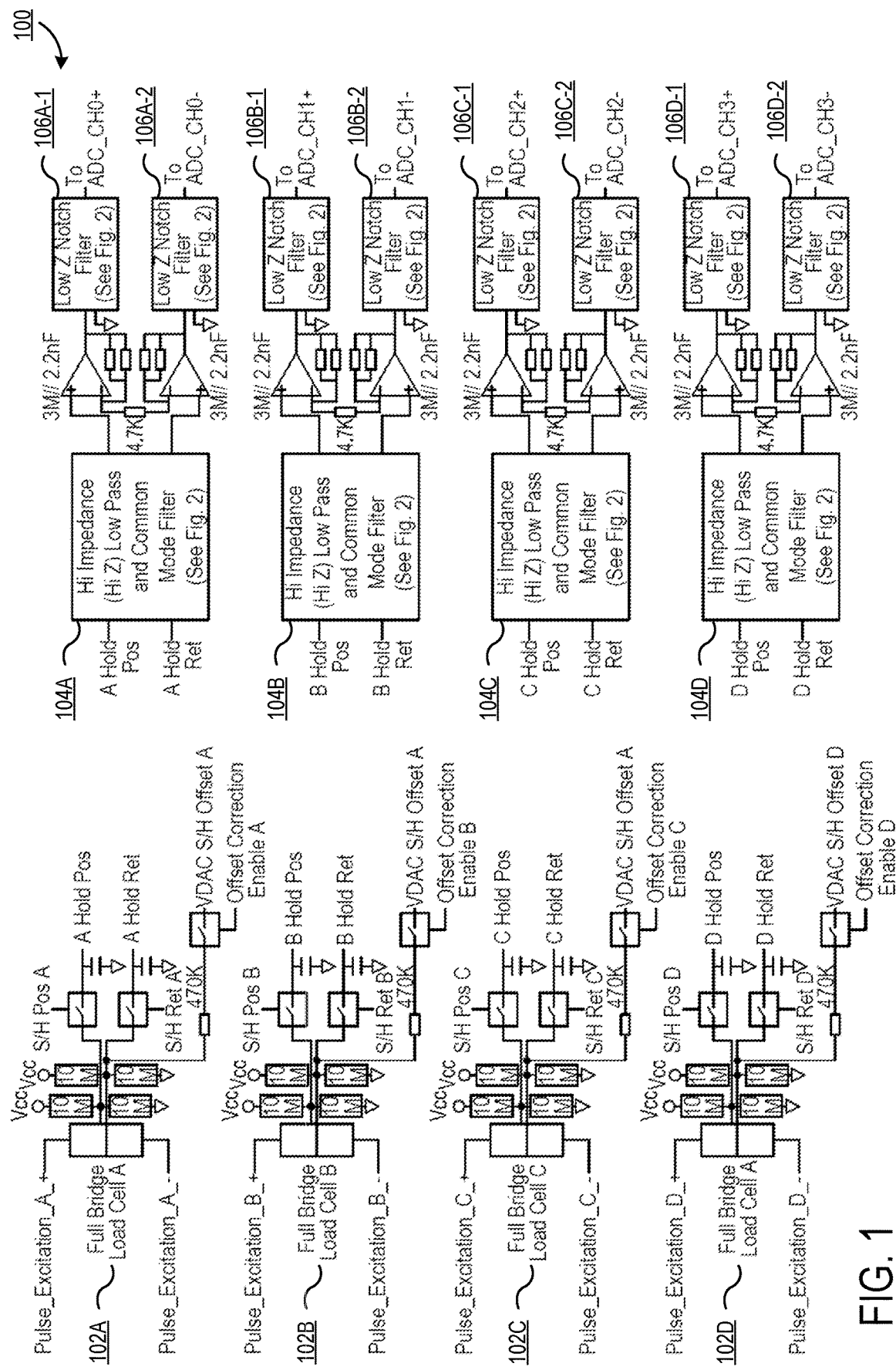
FIG. 1 illustrates a circuit diagram of a full-bridge load cell (FBLC) architecture for implementing pulsing methodologies, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Example embodiments described herein provide certain systems, methods, and devices for pulsing methodologies in strain gauges.

A materials handling facility (facility) or other setting may utilize fixtures to stow or otherwise hold items. The fixture may comprise a platform, such as a shelf. Items may sit on the shelf, or may be contained in another structure, such as a bin, that is in turn supported by the shelf. The same type of item may be stowed on a single shelf, or items may be arranged into lanes. For example, a set of the same type of item that extends from the front of a platform to the back may be deemed a lane.

Users may perform interactions, such as removing or "picking" items from the platform or "placing" items onto the platform. These interactions change the total weight of the items on the shelf. For example, a "pick" will reduce the total weight on the shelf by the weight of the item that was removed. In another example, a "place" will increase the total weight on the shelf by the weight of the item that was put on the shelf. Information about the weight change from a first time $t_1$ to a second time $t_2$ may be used to determine whether an interaction is a pick or a place. In various embodiment, information about the weight of an item is used to determine a quantity of items involved in the interaction. For example, if the change in total weight is measured at −450 grams, and items are known to weigh about 150 grams, a pick of three (3) items may be determined and attributed to the interaction.

Additional information about the interaction may also be determined if weight values are measured at multiple points with respect to the platform. For example, if a weight sensor, such as a load cell, is located at each of the four corners of the platform, a center of gravity of the platform and the items on that platform may be determined at a given time using the four weight values from those weight sensors. Likewise, a change in weight may be used to determine where, with respect to the two-dimensional plane of the platform, a change in center of gravity took place. For example, an estimated location of where the item was picked from with respect to the platform may be determined. This information may be used to determine which lane is associated with the interaction.

A facility may have many fixtures. For example, a facility may have 150 shelving units, each with 6 shelves, resulting in 900 shelves to be provided with weight sensors. The facility may experience heavy use, and be subject to significant traffic and associated wear and tear. As a result, it is desirable for equipment to be as inexpensive as possible while still being physically robust and provide operationally useful data over a long lifespan with little or no maintenance.

The cost and complexity of weight sensors, such as load cells, is based on the type of usage, expected loads, desired resolution, and so forth. For example, a load cell that is able to output weight values with a 10 gram resolution and can support up to a 50 kilogram (kg) load may be significantly more expensive than a load cell with a 100 gram resolution and a maximum load of 5 kg. Load cell cost is significantly impacted based on the sensor technology used and the fabrication involved. For example, a load cell may comprise one or more strain gauges affixed to a support member, such as a beam or plate. The beam is attached at a first end to a support structure while a second end or "live" end supports the load being measured. Strain gauges affixed to the beam are stretched or compressed, depending on their positioning, slightly due to the change in shape of the beam and produce a change in electrical resistance. This electrical resistance may then be measured and ultimately used to determine the weight on the live end.

Depending on the various arrangements of the resistive strain gauges, a load cell may be described as "quarter-bridge", "half-bridge", or "full-bridge". Because the change in electrical resistance by the strain gauges may be very small, resistive strain gauges may be wired into a Wheatstone bridge arrangement that produces a voltage which changes in response to the changes in resistance. This change in voltage is more easily measured than the underlying small change in resistance. A "full-bridge load cell" has four resistive strain gauges, or their equivalent, affixed to a single beam. A "half-bridge load cell" (HBLC) has only two resistive strain gauges, or their equivalent, affixed to a single beam. A "quarter-bridge load cell" has only one resistive strain gauge, or its equivalent, affixed so a single beam.

During operation, a circuit including the resistive strain gauges is operated in the Wheatstone bridge arrangement. A full-bridge load cell uses a circuit that incorporates those four resistive strain gauges, and is able to provide as an output a voltage indicative of the weight. A pair of two HBLCs, each with an opposite polarity, may be combined to operate as a full-bridge load cell. Four single-bridge load cells may also be combined to operate as a full-bridge load cell.

As mentioned above, load cells are costly, and the cost is related to the number of strain gauge elements. For example, a single full-bridge load cell device is more expensive than a single half-bridge load cell device. Traditional systems attempt to minimize cost by using HBLCs or quarter-bridge load cells permanently wired to form a full-bridge circuit. For example, a scale may have four quarter bridge load cells, one on each corner, wired together to operate as a single full-bridge load cell.

In many cases, load cells are located throughout a storage area, fulfillment center, or other facility and utilized to monitor the quantity of inventory within the facility. It may be impractical and/or difficult to provide AC power (e.g., from a wall outlet) to all load cells within the facility. While load cells can instead rely on battery power as a power source, batteries are eventually drained and may need to be replaced or recharged. Pulsing methodologies, described herein may be utilized to reduce the power consumption of load cells. For example, in some embodiments, the pulsing methodology comprises pulsing for a short period of time that is on the order of 1% of the duty cycle, resulting in significantly lower power usage and greatly increase battery life. As described in greater detail below, a pulsing methodology within the scope of this disclosure may decrease the power of the excitation voltage by using a sample and hold that is activated for a short duration and then held, filtered, and amplified to produce a DC value for a measured weight.

In various instances, if a strain gauge is pulsed narrowly, it tends to act as a Dirac delta function. A Dirac delta function can be used to model singularities in physical problems. For example, applying a Dirac delta function to a network may be used to express the frequency response of that network. In various embodiments, this is countered through the use of two like-load cells or a full-bridge load cell and measured differentially so that expression of the transfer function is eliminated as common mode noise, thereby allowing a DC value (e.g., weight value) to be outputted by the strain gauge.

Techniques for pulsed strain gauges are described below. These include methodologies for half-bridge load cells, full-bridge load cells, and application-specific integrated circuits (ASICs).

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 illustrates a circuit diagram 100 of a full-bridge load cell (FBLC) architecture for implementing pulsing methodologies, in accordance with one or more example embodiments of the present disclosure.

As described herein, a strain gauge may refer to a form of transducer that is used to convert applied force, pressure, tension, etc. into a change in electrical resistance which can be displayed on the screen. The strain gauges show a variation in the resistance, whenever there is a fluctuation in temperature, due to increase or decrease in their physical dimension. The design consideration of strain gauge is based on many different factors, such as it is kept in mind that the resistance varies along with a change in strain and the other is that they are attached to a system such that they are affected by strain.

Sensors, such as weight sensors described in connection with FIG. 12 below may be implemented on fixtures within a facility. These fixtures may be used to hold items or physical goods, such as books, pharmaceuticals, repair parts, electronic gear, and so forth. Weight sensors may be used to determine when items are picked from or placed on a fixture. For example, changes in weight may be used to determine that a pick or place has occurred. A strain gauges are used everywhere, they are used with an excitation voltage that drives them that gives some mV per volt level of signal output that is amplified and dealt with.

FIG. 1 depicts a full-bridge load cell diagram, according to at least one embodiment of the present disclosure. In various embodiments, a load cell comprises a plurality of strain gauges in a Wheatstone configuration, bonded to elements that are designed to bend as a load is applied. While one such configuration is depicted in FIG. 1, it should be appreciated that there are many possible permutations of the number of strain gauges, their orientations, the geometry of the load cell, and the strain gauge locations in the load cell. As illustrated in FIG. 1, the system may comprise four full-bridge load cells denoted as full-bridge load cell 102A, full-bridge load cell 102B, full-bridge load cell 102C, and full-bridge load cell 102D.

Continuing on with the circuit diagram of FIG. 1, the circuit comprises two sample and hold circuits located after the load cells. For example, after load cell 102A, there is a first sample and hold circuit and a second sample and hold circuit. Each sample and hold may be used to sample or otherwise capture the voltage of a continuously varying analog signal and hold its value at a constant level for a specified minimum period of time. A first sample and hold for the full-bridge load cell 102A may comprise a first sample and hold circuit that comprises a first switching device and first capacitor for storing a positive excitation value, and the full-bridge load cell 102A may further comprise a second sample and hold that comprises a second switching device and second capacitor for storing a return excitation value. To sample the input signal, the switching device may be connected to the capacitor to the output of a buffer amplifier. The buffer amplifier charges or discharges the capacitor so that the voltage across the capacitor is practically equal, or proportional to, input voltage. In hold mode the switch disconnects the capacitor from the buffer. The capacitor is invariably discharged by its own leakage currents and useful load currents, which makes the circuit inherently volatile, but the loss of voltage (voltage drop) within a specified hold time remains within an acceptable error margin for the intended use cases. The sample and holds may be used to hold "A Hold Pos" representing an excitation voltage and "A Hold Ret" representing a return voltage. In one embodiment, the capacitors of the S/H circuits are 10 nF capacitors that acts as hold elements.

Continuing with FIG. 1, the held values may be provided as inputs to sub-circuit 104A, 104B, 104C, and 104D. In various embodiments, sub-circuit 104A is a passive filter network comprising a high impedance (hi-Z) low pass and common mode filter and a power line rejection filter. The sub-circuit 104A may produce positive and negative outputs that are then provided to respective amplifiers depicted in FIG. 1, which are then passed to sub-circuits 106A-1 and 106A-2 respectively, which may act as power line low impedance (low Z) passive filters that produce output signals that are then provided to analog to digital (ADC) converters. Likewise, sub-circuit 104B may produce positive and negative outputs that are then provided to respective amplifiers depicted in FIG. 1, which are then passed to sub-circuits 106B-1 and 106B-2. Likewise, sub-circuit 104C may produce positive and negative outputs that are then provided to respective amplifiers depicted in FIG. 1, which are then passed to sub-circuits 106C-1 and 106C-2. Likewise, sub-circuit 104D may produce positive and negative outputs that are then provided to respective amplifiers depicted in FIG. 1, which are then passed to sub-circuits 106D-1 and 106D-2. In various embodiments, the various sub-circuits and/or filters described in connection with FIG. 1—including but not limited to sub-circuits 104A, 106A-1, and 106A-2—may be implemented in accordance with techniques described below in connection with FIG. 2.

The load cell itself is pulsed and it is pulsed by a signal pulse that is applied to the sample and holds the excitation voltage. In various embodiments, a LC circuit is utilized to create a sink function to round off the edges. This may be provided to reduce the modulation noise. In various embodiments, the pulse activates the sample and hold, and a derived pulse of that same pulse that is smoothed out to excite the load cell itself. Accordingly, when that excitation reaches the load cell, it sits at or near a midpoint because of the two 10M resistors. Thus, the transition from its nominal midpoint to where a load cell is, is minimized by that pre-biasing and provides the ability to charge that hold capacitor with minimal deviation from a ground or high rail condition and settles much faster. That voltage is then done in two different load cells and filtered and applied to the amplifier.

Pulsing methodologies, for example, as described in greater detail in connection with FIG. 11 below, may be utilized to reduce the power consumption of the load cells. For example, in some embodiments, the pulsing methodology comprises pulsing for a short period of time that is on the order of 1% of the duty cycle, resulting in significantly lower power usage and greatly increase battery life. As described in greater detail below, a pulsing methodology within the scope of this disclosure may decrease the power of the excitation voltage by using a sample and hold that is activated for a short duration and then held, filtered, and amplified to produce a DC value for a measured weight.

In various instances, if a strain gauge is pulsed narrowly, it tends to act as a Dirac delta function. A Dirac delta function can be used to model singularities in physical problems. For example, applying a Dirac delta function to a network may be used to express the frequency response of that network. In various embodiments, this is countered through the use of two like-load cells or a full-bridge load cell and measured differentially so that expression of the transfer function is eliminated as common mode noise, thereby allowing a DC value (e.g., weight value) to be outputted by the strain gauge.

Weight sensors may be placed on fixtures throughout the facility and run on batteries, thereby obviating the need for power drops from wires sources such as Power over Ethernet (PoE) or DC drops around the building to reduce infrastructure. In various embodiments, the load cells may have a target power budget of 500 mW of power or less to power these systems. These budgets may allow the weight sensors to be powered from a battery for a number of years. Pulsed strain gauges may be used to provide a low power solution within the target power budget, which may be on the order of hundreds of milliwatts.

It should be appreciated that the techniques described herein may be utilized to implement low power, integrated wireless sensors for load cells, temp sensors, humidity sensors, etc. and configured to meet power budgets.

Various aspects of pulsed strain gauges are differentiable from other types of load cells. For example, piezo-based devices work off an AC coupled different type of signaling which does not produce a DC level signal (e.g., a weight value). Rather, they work akin to a change sensor. For pulsed strain gauges described herein, even when pulsed, a DC value for a measurement—rather than a change in measurement—may be determined and a constant threshold of level may be given.

By keeping the load cells energized for only a small fraction of the duty cycle, the power consumption of the stain gauge may be dramatically reduced. For example, in various embodiment such as those depicted in FIG. 3, the strain gauge may be energized for approximately 1% of the duty cycle, which allows for much smaller power budgets to be achievable, as compared to standard strain gauge systems.

Various technical advantages may be realized through the implementations described herein, for example, pulsed strain gauges described herein may be implemented using commodity load cells and do not require them to be specifically designed or fabricated to utilize pulsing methodologies described herein.

Various embodiments and alternative designs are contemplated within the scope of this disclosure. For example, the type of load cell may vary based on design considerations—higher millivolt per volt ratings can decrease the gain requirements on the amplification stage so that 1/f noise is minimized by that process. The type of amplifiers may be selected to be chopper stabilized and/or standard linear amplifiers—CMOS linear frontends. Example topologies that can be used for low power include (i) standard or non-chopper stabilized amplifiers that do not modulate the randomized noise that happens from doping impurities in the semiconductor up to a higher frequency of interest beyond the measurement range and (ii) chopper-stabilized amplifiers characterized by their ability to constantly correct low-frequency errors across the inputs of the amplifier. Chopper-stabilized op amps may be preferable alternatives to conventional op amps in various industrial, medical, energy, and automotive applications to simplify and accelerate the design process by reducing or eliminating the need to compensate low-frequency errors such as input offset voltage, input bias current, temperature drift, or pink (1/f) noise. However, a trade-off is that chopper-stabilized amplifiers typically use more power than standard amplifiers, which may or may not be feasible given the particular power budget of a use case.

Figure 2:
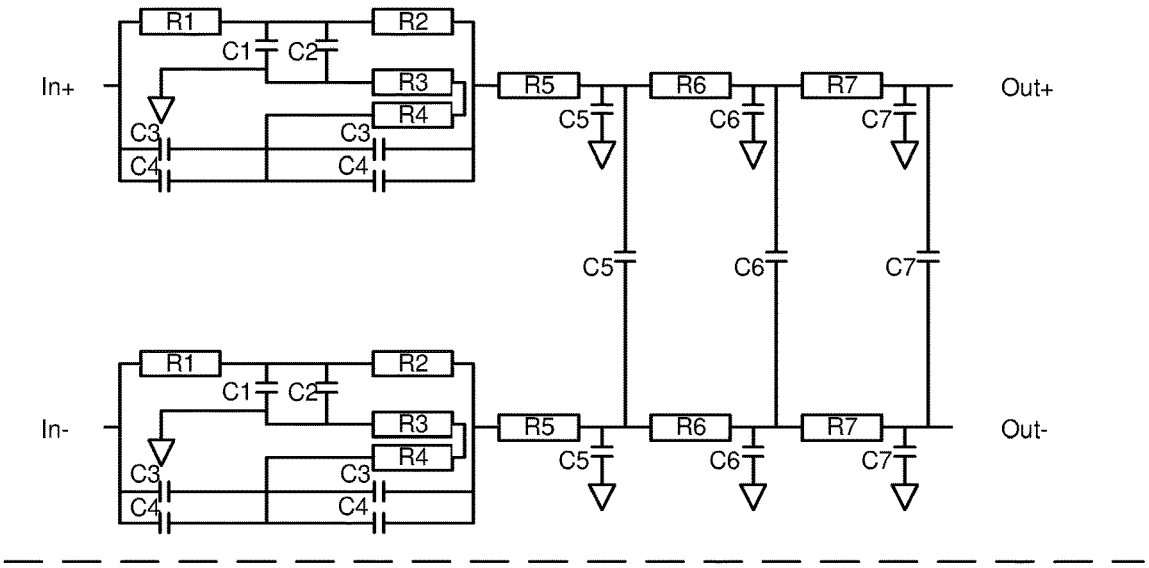
FIG. 2 illustrates a diagram of sub-circuits that may be implemented in the context of a load cell, in accordance with one or more example embodiments of the present disclosure.
Figure 2:
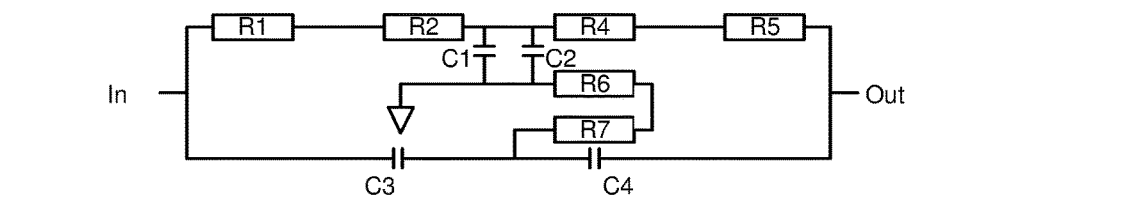
Figure 2:
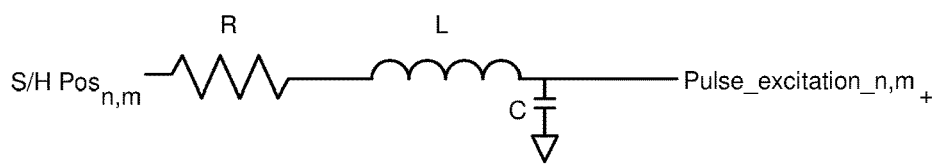
Figure 2:
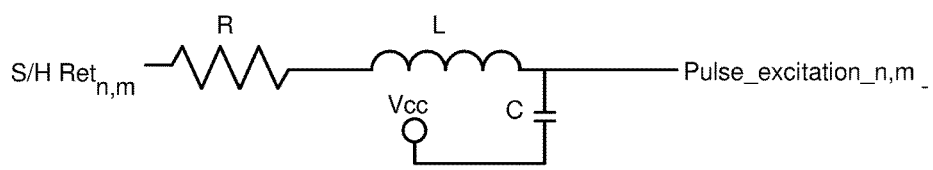

FIG. 2 illustrates a diagram of sub-circuits 200A, 200B, and 200C that may be implemented in the context of a full-bridge load cell, in accordance with one or more example embodiments of the present disclosure. In at least one embodiment, sub-circuit 200A refers to a passive high impedance low pass and common mode filter and power line rejection filter, sub-circuit 200B refers to a power line low impedance notch passive filter, and sub-circuit 200C may be utilized for waveshaping excitation pulses.

Sub-circuit 200A may comprise a positive input and a negative input. The inputs may be received from sample and hold circuits, for example, as described in connection with FIG. 1. The circuit may comprise a notch filter and a low pass filter. A notch filter may refer to an example of a band-rejection filter that is designed to attenuate specific frequency signals. For example, the notch filter of FIG. 2 depicts a 50/60 Hz notch filter. The notch filter may be specifically configured to filter out noise that is coming from AC power sources. In various embodiments, a Twin T notch filter may be implemented to filter out 50/60 Hz noise. The filter may operate by adding two signals that are 180 degrees out of phase at the tuned frequency. In various embodiment, the circuit comprises matching notch filters that are used to filter noise from the positive input "in+" and negative input "in–" terminals.

With a full-bridge load cell, there are two inputs representing a positive excitation and a return excitation. In the case of the sample and hold that happens after the load cells, there are two switches that hold the two values. In various embodiments, capacitor 108A-1 and 108A-2 are 10 nF capacitors that acts as a hold element and following them is a sub-circuit 110A comprising a notch filter and a third order low pass filter. Following the sub-circuit 110A, there is an amplification system and a power line low impedance notch passive filter. Following sub-circuit 114A, the output is provided to an analog-to-digital (ADC) converter.

In various alternative embodiments, multiplexing can be provided and the capacitor in the amplification system can be eliminated, and then the settling time would be a non-issue. Design considerations for such a system may include trading offs between a switch mux for individual amplification and eliminating capacitors.

Following FIG. 2, the sub-circuit 200A may further comprise a third order low pass filter. The outputs of the sub-circuit depicted in FIG. 2 represented by out+ and out– may be provided subsequently to an amplification system, as described in connection with FIG. 1. Circuit 200A may be implemented in the context of FIG. 1 or various other embodiments described throughout this disclosure.

According to various embodiments, the third order low pass filter is formed by cascading or connecting first and second order low pass filters in series. Low pass filters may be used to filter signals and may be characterized by how they are able to pass signals with a frequency lower than a cutoff frequency and attenuates signals with frequencies higher than the cutoff frequency.

It should be noted that the values of the circuitry components depicted in circuit 200A are merely for illustrative purposes and that other configurations and values are also contemplated within the scope of this disclosure. For example in the context of circuit 200A, resistors R1 and R2 may have resistance values of 470K ohms, R3 has a resistance value of 220K ohms, R4 has a resistance value of 15K ohms, and R5, R6, and R7 may have resistance values of 1M ohms, accordance to at least one embodiment of the present disclosure. For example, in the context of circuit 200A, capacitor C1 may have a capacitance value of 1 nF, C2 may have a capacitance value of 10 nF, C3 may have a capacitance value of 4.7 nF, C4 may have a capacitance value of 1 nF, C5 may have a capacitance value of 6.8 nF, C6 may have a capacitance value of 3.3 nF, and C7 may have a capacitance value of 2.2 nF.

Sub-circuit 200B may be implemented for power line low impedance notch passive filter. Circuit 200B may comprise an input and an output. In various embodiments, circuit 200B is provided as a low impedance notch filter that is provided the output of an amplification system, for example, as depicted in FIG. 1. In various embodiments, the notch filter is configured to suppress white noise, for example, 60 Hz white noise, 50 Hz white noise, or a range that includes 50 Hz and/or 60 Hz white noise. Circuit 200B may be implemented in the context of FIG. 1 or various other embodiments described throughout this disclosure.

It should be noted that the values of the circuitry components depicted in circuit 200B are merely for illustrative purposes and that other configurations and values are also contemplated within the scope of this disclosure. For example, in the context of circuit 200B, resistors R1 may have a value of 2R, R2 may have a value of 562R, R3 may have a value of 2R, R4 may have a value of 562R, R6 may have a value of 2R, R7 may have a value of 280R, in accordance with at least one embodiment of the present disclosure. For example, in the context of circuit 200B, capacitors C1, C2, C3, and C4 may have a capacitance value of 4.7 uF.

Figure 3:
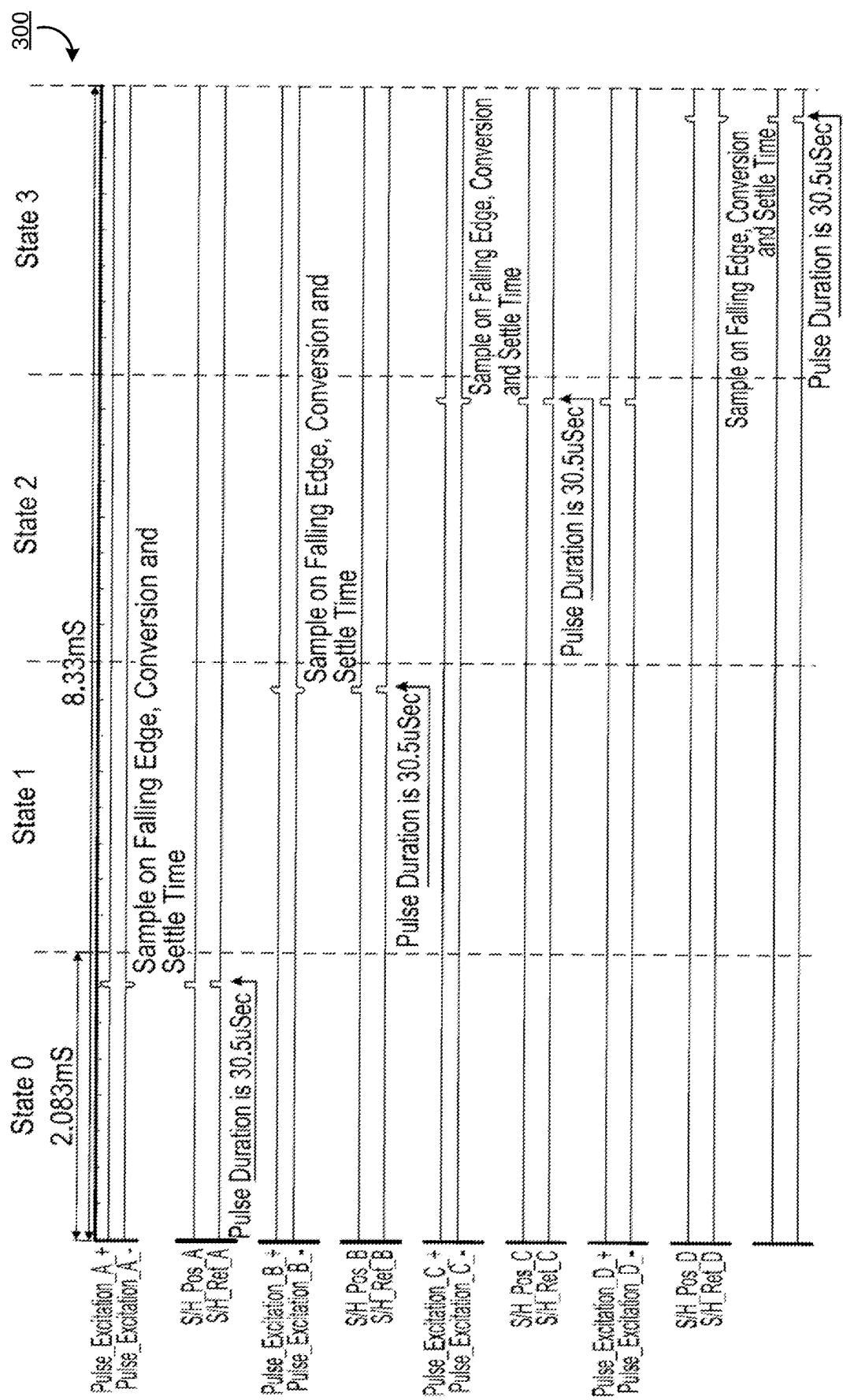
FIG. 3 illustrates a timing diagram for pulsing a load cell circuit, in accordance with one or more example embodiments of the present disclosure.

Sub-circuit 200C may be implemented for waveshaping for EMC for excitation pulses. Circuit 200C may comprise inputs that are provided by the S/H pos and S/H ret circuitry of FIG. 1—for example, both pos and ret excitation voltages depicted in FIG. 1. In various embodiments, the input is provided to a circuit comprising a resistor, inductor, and capacitor, for example, as configured in FIG. 2. Circuit 200C may comprise a series RL shaping circuit. In at least one embodiment, the circuit 200C may be implemented with the following values: R=100K ohm, L=470 uH, and C=50 nF. The output of the waveshaping circuit may provide the positive and negative pulse excitation voltages, for example, as depicted in FIG. 3. The outputs may be provided to dual pairs of half-bridge load cells 1K equivalent impedance. Circuit 200C may be implemented in the context of FIG. 1 or various other embodiments described throughout this disclosure.

FIG. 3 illustrates a timing diagram 300 for pulsing a load cell circuit, in accordance with one or more example embodiments of the present disclosure. The timing diagram 300 of FIG. 3 may be applicable to some or all load cell based implementations, including full-bridge load cell architectures described in connection with FIG. 1 and/or half-bridge load cell architectures described in connection with FIG. 4

In various embodiments, the timing diagram depicted in FIG. 3 depicts waveforms that may be produced as part of pulsing methodologies described herein. The waveforms may be applicable to various embodiments, including those implemented using full-bridge load cell and half-bridge load cell architectures.

Turning to FIG. 3, within the waveforms depicted in diagram 300, each of the sections may be sampled at 120 hz with a full window of $1/120$=8.333 msec. The window may be divided into four equal state periods of approximately 2.083 msec, with one portion of the window for each of the four load cells (e.g., as depicted in FIG. 1). For example, a first pulse excitation for a first load cell may be activated during "State 0", a second pulse excitation for a second load cell may be activated during "State 1", and so on and so forth. In various embodiments, the active duty cycle of the load cell is approximately 30.5 microseconds. The pulses may be as short as 15 microseconds, 20 microseconds, 25 microseconds, or 30 microseconds in various embodiments. The duty cycle may be determined based on the microcontroller that is used and selection of a suitable frequency. For example, a microcontroller may operate at various power modes. The lowest power mode may be preferably selected, although other configurations are also possible. For example, FIG. 3 depicts an embodiment in which a microcontroller with a 32.768 KHz crystal is used. In various embodiments, the sample and hold capacitors can be scaled and sized to meet the turn on time requirements of the specific use cases that they are to be used for.

The load cell itself is pulsed and it is pulsed by a signal pulse that is applied to the sample and hold the excitation voltage. In various embodiments, a LC circuit is utilized to create a sink function to round off the edges. This may be provided to reduce the modulation noise. In various embodiments, the pulse activates the sample and hold, and a derived pulse of that same pulse that is smoothed out to excite the load cell itself. Accordingly, when that excitation reaches the load cell, it sits at or near a midpoint because of the two resistors. Thus, the transition from its nominal midpoint to where a load cell is, is minimized by that pre-biasing and provides the ability to charge that hold capacitor with minimal deviation from a ground or high rail condition and settles much faster. That voltage is then done in two different load cells and filtered and applied to the amplifier.

Returning to the timing diagram, when the input signal is bumped up, a modest, triangle-shaped wave is charged when the pulse is applied and then decays slowly because of the high impedance of the filter. The signal becomes a DC level once it goes through the third order filter that has no tilt to it. In other words, a DC level is created once it goes through the third order filter and allows for a DC waveform to be constructed from a pulsed waveform.

The pulse excitation waveforms may be in the form of a half-sine wave or other suitable tapered waveform. One of the reasons for this shape is to avoid intermodulation noise that would be present in square-shaped waveforms.

The pulse duration may be configured to be longer or shorter based on various factors such as cost, power budget, availability of components, and so on and so forth. If a narrower pulse is desired, the capacitor may be changed to be a smaller value. If a larger resistance load cell is desired, that capacitor value will also be decreased. One benefit of a larger load cell is the amount of power it takes to run it is less. The advantage of the higher millivolt per volt load cell is that the amount of gain needed to run it is less, meaning that the intrinsic noise (1/f) is lower.

Figure 4:
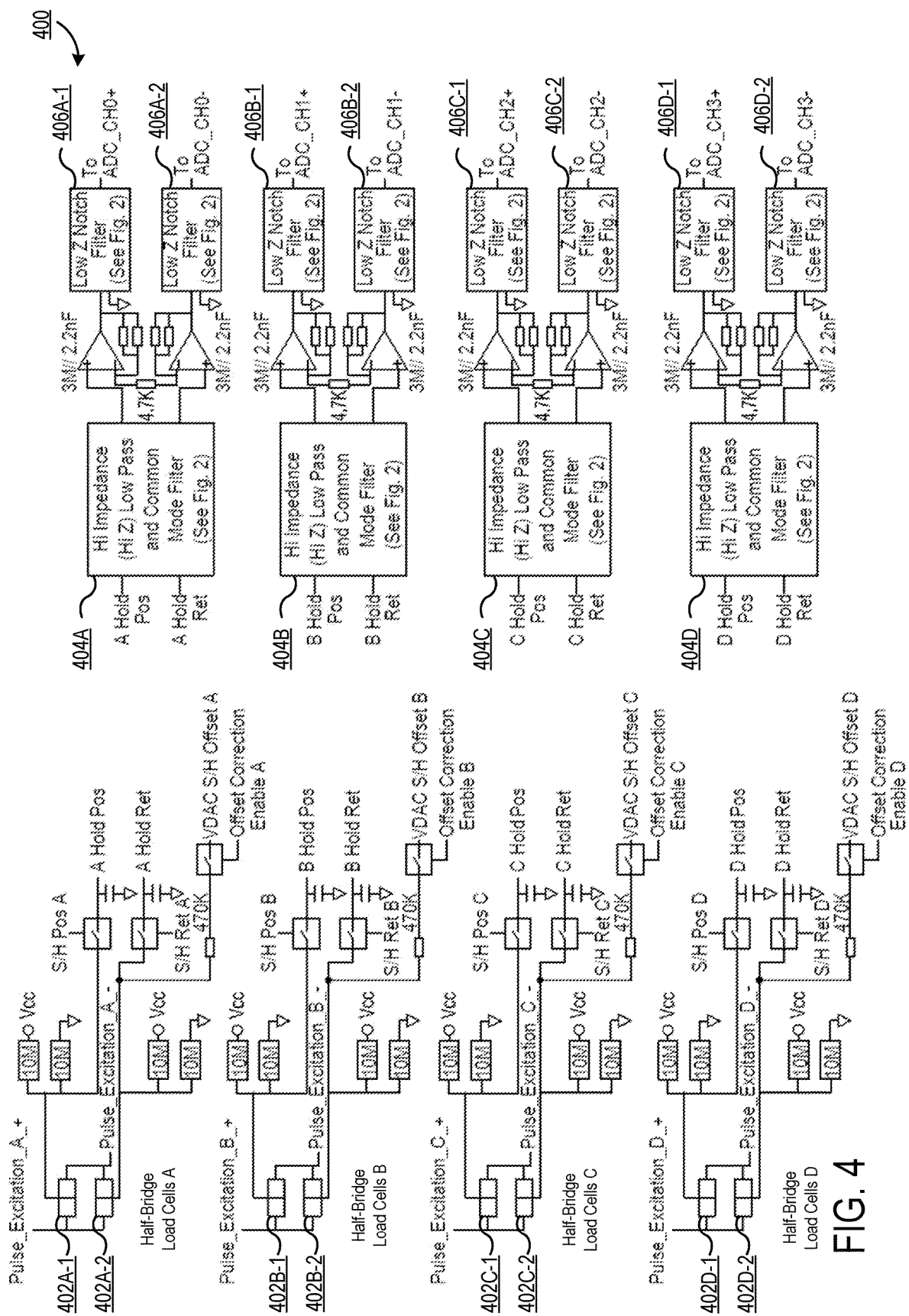
FIG. 4 illustrates a circuit diagram of a half-bridge load cell (HBLC) architecture for implementing pulsing methodologies, in accordance with one or more example embodiments of the present disclosure.

FIG. 4 illustrates a circuit diagram 400 of a half-bridge load cell (HBLC) architecture for implementing pulsing methodologies, in accordance with one or more example embodiments of the present disclosure.

FIG. 4 depicts a circuit diagram 400 for pulsed strain gauges in a half-bridge load cell architecture, according to at least one embodiment of the present disclosure. In various embodiments, a load cell comprises a plurality of strain gauges in a Wheatstone configuration, bonded to elements that are designed to bend as a load is applied. While one such configuration is depicted in FIG. 4, it should be appreciated that there are many possible permutations of the number of strain gauges, their orientations, the geometry of the load cell, and the strain gauge locations in the load cell. As illustrated in FIG. 4, the system may comprise four pairs of half-bridge load cells denoted as half-bridge load cells 402A-1 and 402A-2, half-bridge load cells 402B-1 and 402B-2, half-bridge load cells 402C-1 and 402C-2, and half-bridge load cells 402D-1 and 402D-2.

Figure 6:
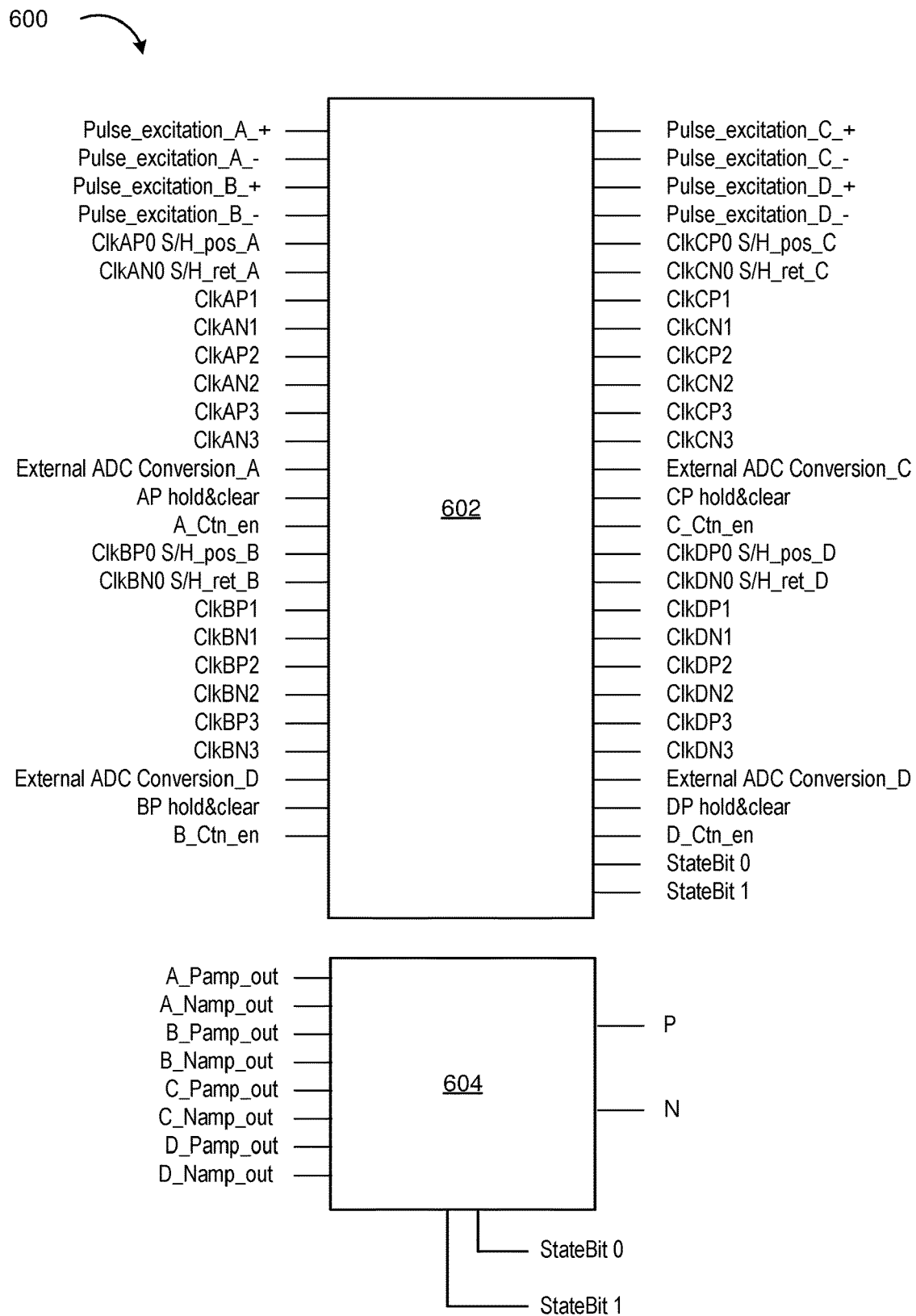
FIG. 6 illustrates a diagram of an integrated circuit design, which may be implemented in the context of an application-specific integrated circuit (ASIC), in accordance with one or more example embodiments of the present disclosure.

Various techniques described in connection with FIG. 1 may be applicable to the half-bridge architecture depicted in FIG. 4. In various embodiments, the use of two half-bridges may be used in place of a full-bridge. For example, half-bridge load cells 402A-1 and 402A-2 may replace a full-bridge load cell. An advantage of this design is that multiple half-bridge load cells can be integrated into the physical geometry of a circuit as smaller pieces and at different locations. This may be used to increase the location accuracy. For example, various geometrics can be accommodated beyond typical front-to-back, left-to-right that is typical in full-bridge configurations. For example, half-bridge load cells can accommodate diagonal triangulation vectors as well, for example, as depicted in FIG. 6.

Continuing with FIG. 4, the held values may be provided as inputs to sub-circuit 404A, 404B, 404C, and 404D. In various embodiments, sub-circuit 404A is a passive filter network comprising a high impedance (hi-Z) low pass and common mode filter and a power line rejection filter. The sub-circuit 404A may produce positive and negative outputs that are then provided to respective amplifiers depicted in FIG. 4, which are then passed to sub-circuits 406A-1 and 406A-2 respectively, which may act as power line low impedance (low Z) passive filters that produce output signals that are then provided to analog to digital (ADC) converters. Likewise, sub-circuit 404B may produce positive and negative outputs that are then provided to respective amplifiers depicted in FIG. 4, which are then passed to sub-circuits 406B-1 and 406B-2. Likewise, sub-circuit 404C may produce positive and negative outputs that are then provided to respective amplifiers depicted in FIG. 4, which are then passed to sub-circuits 406C-1 and 406C-2. Likewise, sub-circuit 404D may produce positive and negative outputs that are then provided to respective amplifiers depicted in FIG. 4, which are then passed to sub-circuits 406D-1 and 406D-2. In various embodiments, the various sub-circuits and/or filters described in connection with FIG. 4—including but not limited to sub-circuits 404A, 406A-1, and 406A-2—may be implemented in accordance with techniques described above in connection with FIG. 2.

The load cell itself is pulsed and it is pulsed by a signal pulse that is applied to the sample and hold the excitation voltage. In various embodiments, a LC circuit is utilized to create a sink function to round off the edges. This may be provided to reduce the modulation noise. In various embodiments, the pulse activates the sample and hold, and a derived pulse of that same pulse that is smoothed out to excite the load cell itself. Accordingly, when that excitation reaches the load cell, it sits at or near a midpoint because of the two 10M resistors. Thus, the transition from its nominal midpoint to where a load cell is, is minimized by that pre-biasing and provides the ability to charge that hold capacitor with minimal deviation from a ground or high rail condition and settles much faster. That voltage is then done in two different load cells and filtered and applied to the amplifier.

Pulsing methodologies, for example, as described in greater detail in connection with FIG. 11 below, may be utilized to reduce the power consumption of the load cells. For example, in some embodiments, the pulsing methodology comprises pulsing for a short period of time that is on the order of 1% of the duty cycle, resulting in significantly lower power usage and greatly increase battery life. As described in greater detail below, a pulsing methodology within the scope of this disclosure may decrease the power of the excitation voltage by using a sample and hold that is activated for a short duration and then held, filtered, and amplified to produce a DC value for a measured weight.

In various instances, if a strain gauge is pulsed narrowly, it tends to act as a Dirac delta function. A Dirac delta function can be used to model singularities in physical problems. For example, applying a Dirac delta function to a network may be used to express the frequency response of that network. In various embodiments, this is countered through the use of two like-load cells or a full-bridge load cell and measured differentially so that expression of the transfer function is eliminated as common mode noise, thereby allowing a DC value (e.g., weight value) to be outputted by the strain gauge.

Weight sensors may be placed on fixtures throughout the facility and run on batteries, thereby obviating the need for power drops from wires sources such as Power over Ethernet (PoE) or DC drops around the building to reduce infrastructure. In various embodiments, the load cells may have a target power budget of 500 mW of power or less to power these systems. These budgets may allow the weight sensors to be powered from a battery for a number of years. Pulsed strain gauges may be used to provide a low power solution within the target power budget, which may be on the order of hundreds of milliwatts.

It should be appreciated that the techniques described herein may be utilized to implement low power, integrated wireless sensors for load cells, temp sensors, humidity sensors, etc. and configured to meet power budgets.

Various aspects of pulsed strain gauges are differentiable from other types of load cells. For example, piezo-based devices work off an AC coupled difference type of signaling which does not produce a DC level signal (e.g., a weight value). Rather, they work akin to a change sensor. For pulsed strain gauges described herein, even when pulsed, a DC value for a measurement—rather than a change in measurement—may be determined and a constant threshold of level may be given.

By keeping the load cells energized for only a small fraction of the duty cycle, the power consumption of the stain gauge may be dramatically reduced. For example, in various embodiment such as those depicted in FIG. 3, the strain gauge may be energized for approximately 1% of the duty cycle, which allows for much smaller power budgets to be achievable, as compared to standard strain gauge systems. Accordingly, strain gauges implemented in the context of FIG. 4 may utilize significantly less energy as the pulsing methodologies described herein as the load cells may be energized for only a small fraction of each duty cycle.

Various technical advantages may be realized through the implementations described herein, for example, pulsed strain gauges described herein may be implemented using commodity load cells and do not require them to be specifically designed or fabricated to utilize pulsing methodologies described herein.

Various embodiments and alternative designs are contemplated within the scope of this disclosure. For example, the type of load cell may vary based on design considerations—higher millivolt per volt ratings can decrease the gain requirements on the amplification stage so that 1/f noise is minimized by that process. The type of amplifiers may be selected to be chopper stabilized and/or standard linear amplifiers—CMOS linear frontends. Example topologies that can be used for low power include (i) standard or non-chopper stabilized amplifiers that do not modulate the randomized noise that happens from doping impurities in the semiconductor up to a higher frequency of interest beyond the measurement range and (ii) chopper-stabilized amplifiers characterized by their ability to constantly correct low-frequency errors across the inputs of the amplifier. Chopper-stabilized op amps may be preferable alternatives to conventional op amps in various industrial, medical, energy, and automotive applications to simplify and accelerate the design process by reducing or eliminating the need to compensate low-frequency errors such as input offset voltage, input bias current, temperature drift, or pink (1/f) noise. However, a trade-off is that chopper-stabilized amplifiers typically use more power than standard amplifiers, which may or may not be feasible given the particular power budget of a use case.

Figure 5:
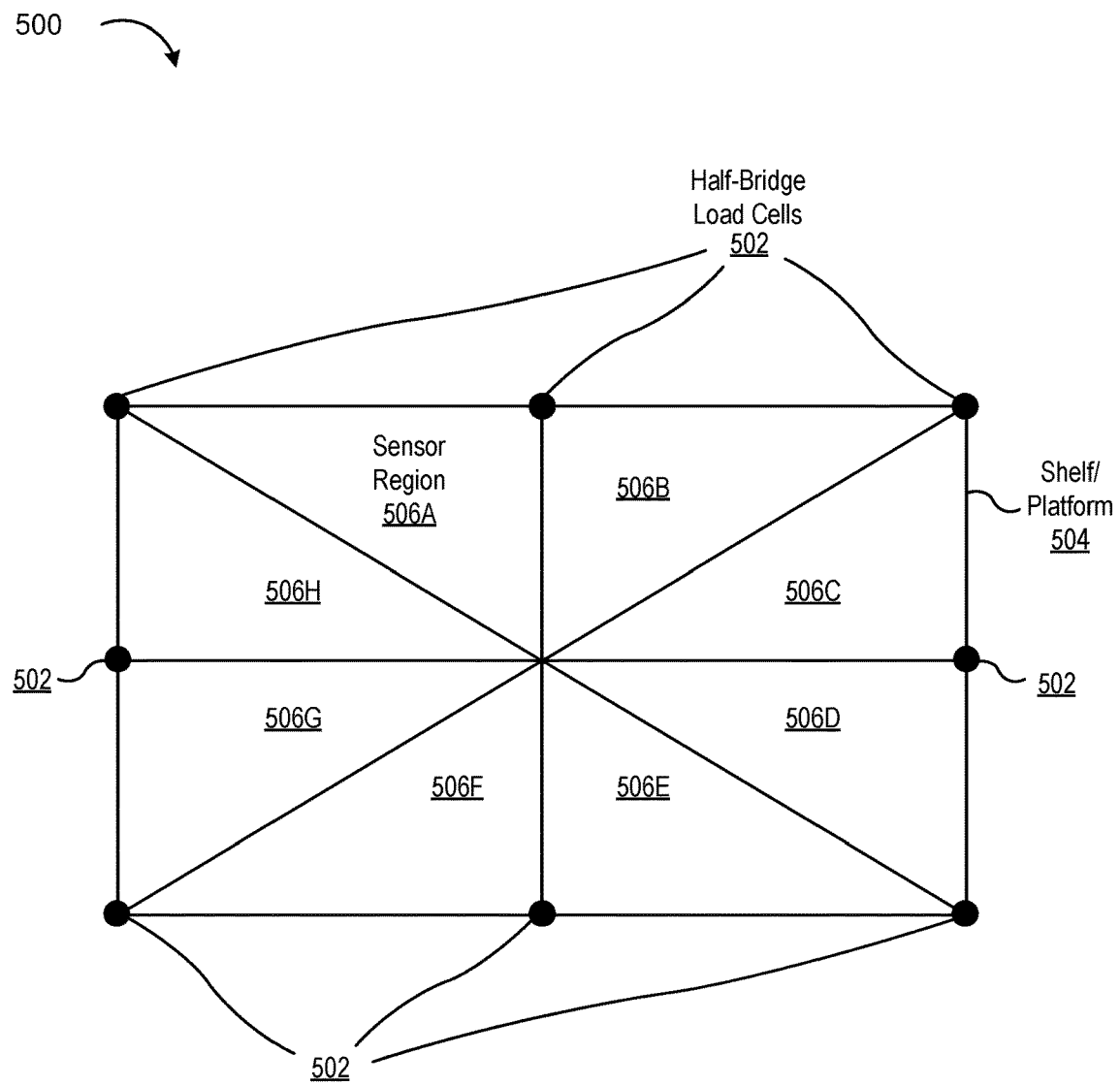
FIG. 5 illustrates a diagram of a geometric configuration half-bridge load cells (HBLCs) for enhancing location accuracy, in accordance with one or more example embodiments of the present disclosure.

FIG. 5 illustrates a diagram 500 of a geometric configuration half-bridge load cells (HBLCs) for enhancing location accuracy, in accordance with one or more example embodiments of the present disclosure.

In various embodiment, half-bridge load cells may be utilized for enhancing location accuracy of weight sensors or other types of sensors within a facility. Turning to FIG. 5, the diagram depicts a geometric configuration of eight half-bridge load cells 502 that may be placed beneath a shelf or platform 504. The apparatus may be implemented in the context of a facility, for example, in the context of FIG. 12.

FIG. 5 depicts a vector diagram that shows means of measuring relative to various points on a platform using eight half-bridge load cells. This configuration, illustrative and non-limiting in nature, allows for gathering weight information on diagonals, information on the center, front-to-back, left-to-right in these various different areas. This configuration allows for breaking up a platform into eight triangular regions, denoted in FIG. 5 as sensor regions 506A, 506B, 506C, 506D, 506E, 506F, 506G, and 506H.

During operation of a facility, the sensors may be configured to provide sensor data, or information based on the sensor data, to an inventory management system. The sensor data may include weight data obtained from half-bridge load cells 502 and/or other non-weight data obtained from other sensors such as cameras, 3D sensors, optical sensor arrays, proximity sensors, light curtains, and so forth. The sensors are described in more detail below, for example, below in connection with FIG. 12. In various embodiment, the weight data comprises data generated by half-bridge load cells 502 configured to measure the weight of inventory in sensor regions 506A-H that stow the items. For example, weight sensor may comprise a load cell beneath a load that may include a shelf or platform of the inventory location. By reading one or more characteristics of the load cell, the weight of the load may be determined.

In various embodiments, the additional current for four additional load cells is on the order of tens of microamps. For example, the additional current for four additional loads cells may be approximately 13 uA for the load cells as they are sequenced and 20 uA for additional circuitry at 1.8V. Measurement across the vector lines may be utilized to yield higher physical resolution and allow use of on board 12 bit ADCs as the geometries for triangulation are smaller. Resolution requirement may be calculated inversely proportional to size. For example, to get 16 bits of resolution for a full-sized 2×4 shelf, the area of the shelf is divided by the 16 bits, then the location and the resolution at the low end provides a granularity of how to measure position front and back. By breaking that full area down into smaller regions, two things happen—the resolution requirement for that area goes down and it provides the ability to get a better noise resolution as a function of that breaking up into regions.

Conversely, a full-bridge load cell topology may have load cells at the four corners of a shelf. In a half-bridge load cell configuration, since there are double the number of load cells, they may be placed at corners and midpoints of a shelf or platform to provide for better resolution.

FIG. 6 illustrates a diagram 600 of an integrated circuit design, which may be implemented in the context of an application-specific integrated circuit (ASIC), in accordance with one or more example embodiments of the present disclosure.

In various embodiments, an integrated circuit 602 comprises a plurality of inputs and outputs. IC 602 may be an application-specific integrated circuit (ASIC). IC 602 may comprise glue logic and internal signal generation components, which may include some or all of those described in connection with FIG. 7 and/or FIG. 8. For example, the integrated circuit may comprise a plurality of switch cap filter blocks, pulse width timing ADC conversion blocks that may be used to implement strain gauges for determining weight measurements. Pulsing methodologies such as those described in connection with FIG. 11 may be implemented in the context of FIG. 6.

Figure 7:
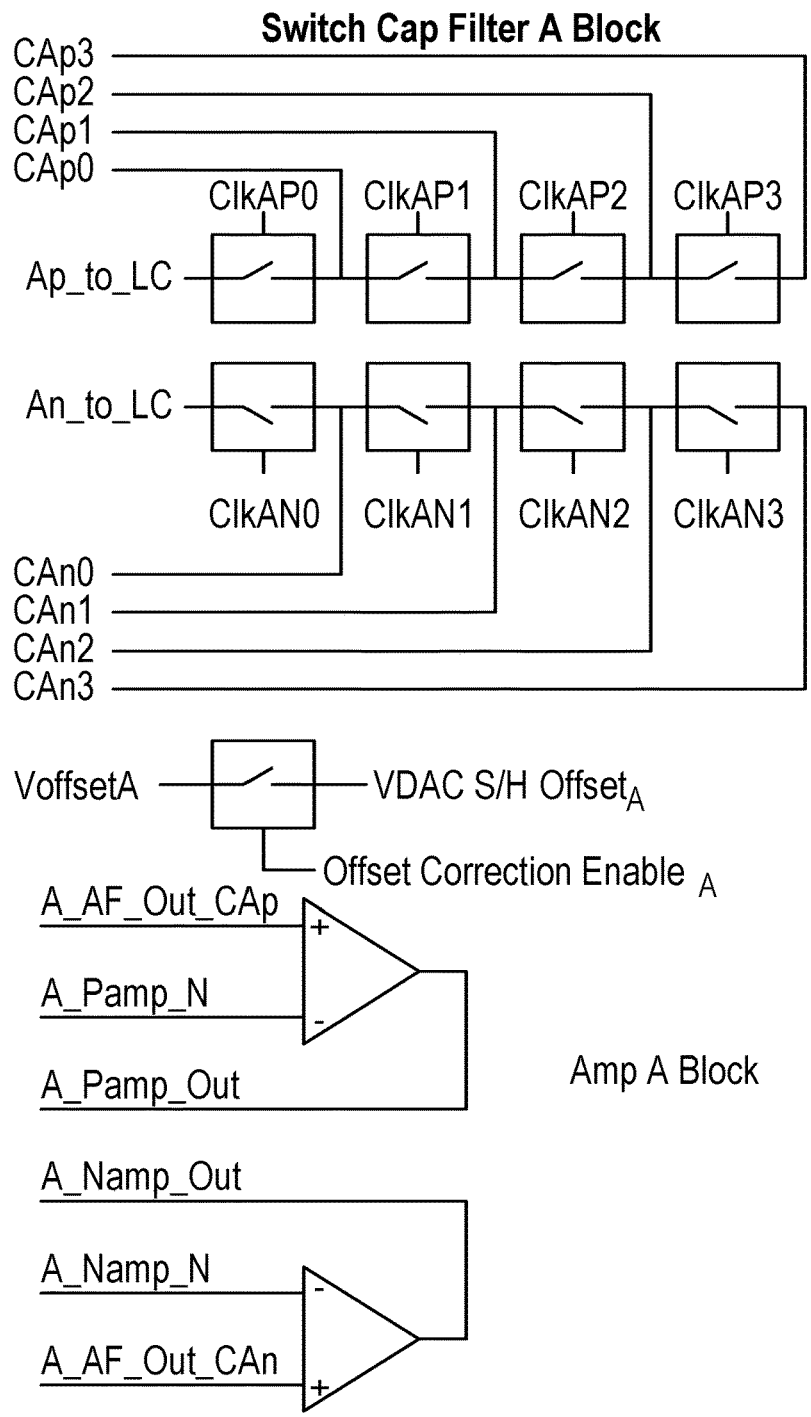
FIG. 7 illustrates a diagram of a switched capacitor filter block, which may be implemented in the context of an application-specific integrated circuit (ASIC), in accordance with one or more example embodiments of the present disclosure.

In various embodiments, integrated circuit 602 may comprise inputs/outputs as depicted in connection with FIG. 6. Integrated circuit 602 may implement a plurality of switch cap filter blocks, for example, as depicted in FIG. 7. For example, switch cap filters A-D may be implemented. For a first switch cap filter A, there the integrated circuit may comprise inputs/outputs including clocks such as ClkAP0 for a first positive sample and hold (denoted as S/H_pos_A_, ClkAN0 for a first negative sample and hold (denoted as S/H_pos_B) and likewise, additional clocks for additional sample and holds denoted as ClkAP1/ClkAN1, ClkAP2/ClkAN2, and ClkAP3/ClkAN3. For a first pulse width timing ADC conversion circuit A, the integrated circuit may comprise inputs/outputs for AP hold & clear, A_Ctn_en. A_Ctn_en may refer to the output of a duty cycle counter. In various embodiments, integrated circuit 602 comprises Pulse_excitation_A_+ and Pulse_excitation_A_– that may be provided to an external LC wave shaping circuit before LC.

Integrated circuit 602 may further comprise state bits (e.g., StateBit0 and StateBit1) that may be used as selectors for multiplexer 604. In various embodiments, multiplexer 604 is an analog 4 to 2 mux. The state bits may be used to multiplex between input signals A-D. for example, the outputs P and N may correspond to A_Pamp_out and A_Namp_out or B_Pamp_out and B_Namp_out or C_Pamp_out and C_Namp_out or D_Pamp_out and D_Namp_out, depending on the state bit values. The mux outputs may be provided to an external analog to digital (ADC) converter.

FIG. 7 illustrates a diagram 700 of a switch cap filter block, which may be implemented in the context of an application-specific integrated circuit (ASIC), in accordance with one or more example embodiments of the present disclosure.

A switched capacitor, for example, according to diagram 700, may be an electronic circuit element used in discrete time signal processing systems and incorporated into integrated circuits such as those described in connection with FIG. 6. Switch cap filters A-D may be implemented in an ASIC. FIG. 7 depicts an illustrative Switch Cap Filter Block A, which may be one among several switch cap filters implemented in the context of an ASIC-based design. Switch cap filters may be characterized by their ability to transfer charge onto and off of a capacitor when switches are opened and closed. Unlike other architectures, such as those depicted in FIG. 1 and FIG. 4, the switch cap filter may lack the use of a resistor, which are difficult to build into integrated circuits due to their large footprints. Instead, switch cap filter block depicted in FIG. 7 may be implemented into integrated circuits such as ASICs and utilize capacitor s that depend on the ratios between capacitances and the switching frequency, rather than on passive resistor elements. This makes them much more suitable for use within integrated circuits, where the accurately specified absolute value of passive components such as resistors and capacitors are not economical to construct.

Switched capacitor (switch-cap or switch cap) filtering may be preferably integrated into ASIC designs. Switched capacitor filters may function similarly to a passive filter, but may be easier to integrate into a and is less of a burden to the external design as compared to resistor-based designs. The switch cap filter block may comprise a swap buffer dual port memory that acts as a first-in-first-out (FIFO) storage element or buffer. The design can be conceptualized as two halves, one of which automatically fills into the buffer and then swaps to allow the other half that is being manipulated with from an outside construct. For example, for a 1k buffer and sampling every 1 millisecond, three would be up to 500 milliseconds for each half to fill or unload.

Positive and negative input signals in FIG. 7 are denoted as Ap_to_LC and An_to_LC respectively and are provided to respective switches. Each of the switch outputs goes off board to a pin to use a capacitor denoted as CAp0-3 and CAn0-3, respectively. The rate at which the filter is run is determined by the state machine and may conform to the timing diagram described in connection with FIG. 10.

The switch cap filter may further have an amplifier block denoted as "Amp A Block" in FIG. 7. This provides the ability to have the same amplification that was discussed in connection with HBLC and/or FBLC systems in FIG. 1 and FIG. 4. These blocks allow for filtration and amplification, for input signals.

Figure 8:
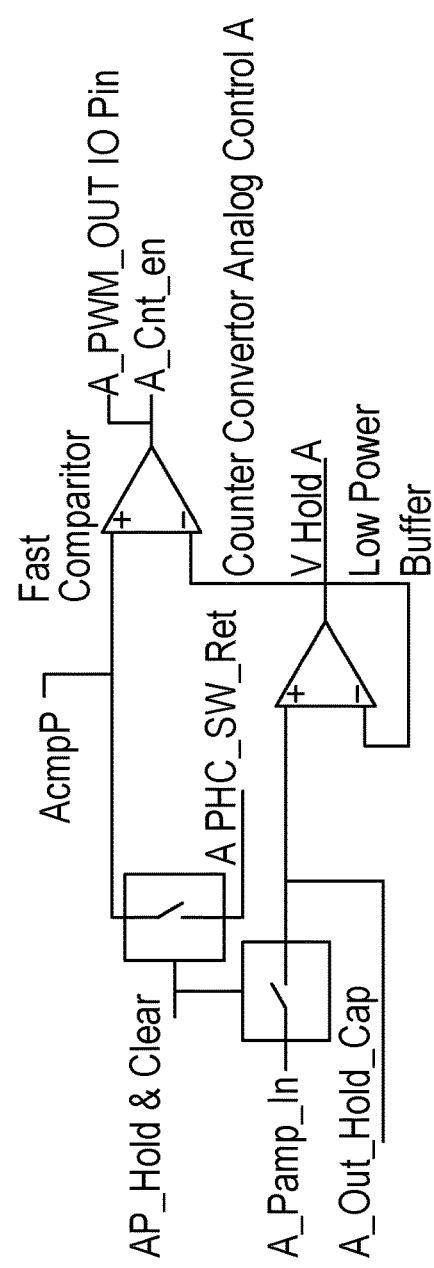
FIG. 8 illustrates a circuit diagram for a pulse width timing analog-to-digital (ADC) conversion block, which may be implemented in the context of an application-specific integrated circuit (ASIC), in accordance with one or more example embodiments of the present disclosure.

FIG. 8 illustrates a circuit diagram 800 for a pulse width timing analog-to-digital (ADC) conversion block, which may be implemented in the context of an application-specific integrated circuit (ASIC), in accordance with one or more example embodiments of the present disclosure.

In various embodiments, the circuit comprises two switches and two amplifiers. The circuit may be used to generate a pulse width modulated output whose duty cycle is directly proportional to the applied voltage. This type of methodology allows for a resistor and capacitor to create an integral and provides a DC level that is updated based on the pulse width modulation of the output voltage proportionally. In various embodiments, timers may be used to replace ADC converters. Timers may be characterized as being cheaper to implement, and running a timer at a high clock rate may provide a high resolution relative to the ADC converter. Accordingly, instead of running an ADC, a timer may be run between events and based on whatever the ON time is to determine the conversion.

Figure 9:
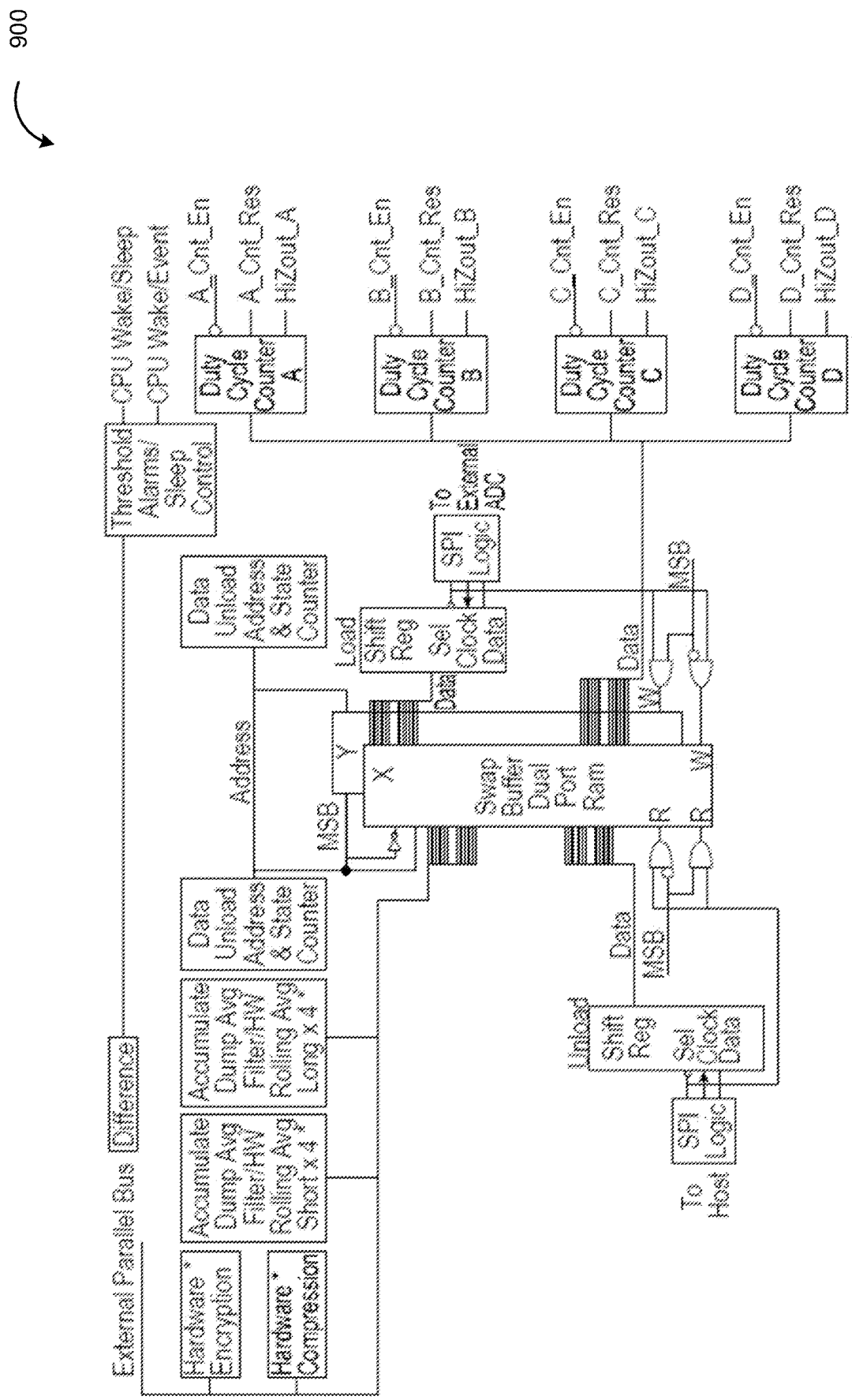
FIG. 9 illustrates a diagram of an environment in which an integrated circuit may be implemented, in accordance with one or more example embodiments of the present disclosure.

FIG. 9 illustrates a diagram 900 of an environment in which an integrated circuit may be implemented, in accordance with one or more example embodiments of the present disclosure.

An application-specific integrated circuits (ASICs) such as those described above may be implemented in the context of FIG. 9. For example, the ASIC may implement various functionality depicted in FIG. 9, including any suitable combination of hardware encryption modules, hardware compression modules, accumulate dump modules for calculating rolling averages, data unload address and state counters, data load address and state counters, threshold alarms and sleep controls, shift registers, serial peripheral interface (SPI) logic, logical gates, and so on and so forth. The state timing for the circuit may be based on a timer. This timer may be used to create the waveforms that drive the circuit to capture the states, fill the buffers, run the machines, and so on and so forth. To manage the flow of raw data, a hardware compression module may be used. In various embodiments, a hardware encryption module is used to encrypt data at the source. In various data paths, the accumulate dump filters may be used to take rolling averages (e.g., of weight measurements). The rolling averages may be used to implement a change detector (e.g., indicating a pick or place) by comparing data as a function of a rolling average or for filtering data, or for performing other manipulations of the data using the aforementioned average constructs. It has the ability to create an onboard change detector. Thus, if the data flow does not need to be moved offsite, the change detection can be implemented entirely within the hardware and it would basically allow for a minimal access model and low power.

FIG. 9 may incorporate various circuitry described herein, such as pulse width timing ADC conversion blocks discussed in connection with FIG. 8. In various embodiments, a single counter may be multiplexed for a higher clock rate as a simplicity and power tradeoff. In an example embodiment, a 4 timer model requires roughly 2 MHz clock frequency for a 16 bit model.

Figure 10:
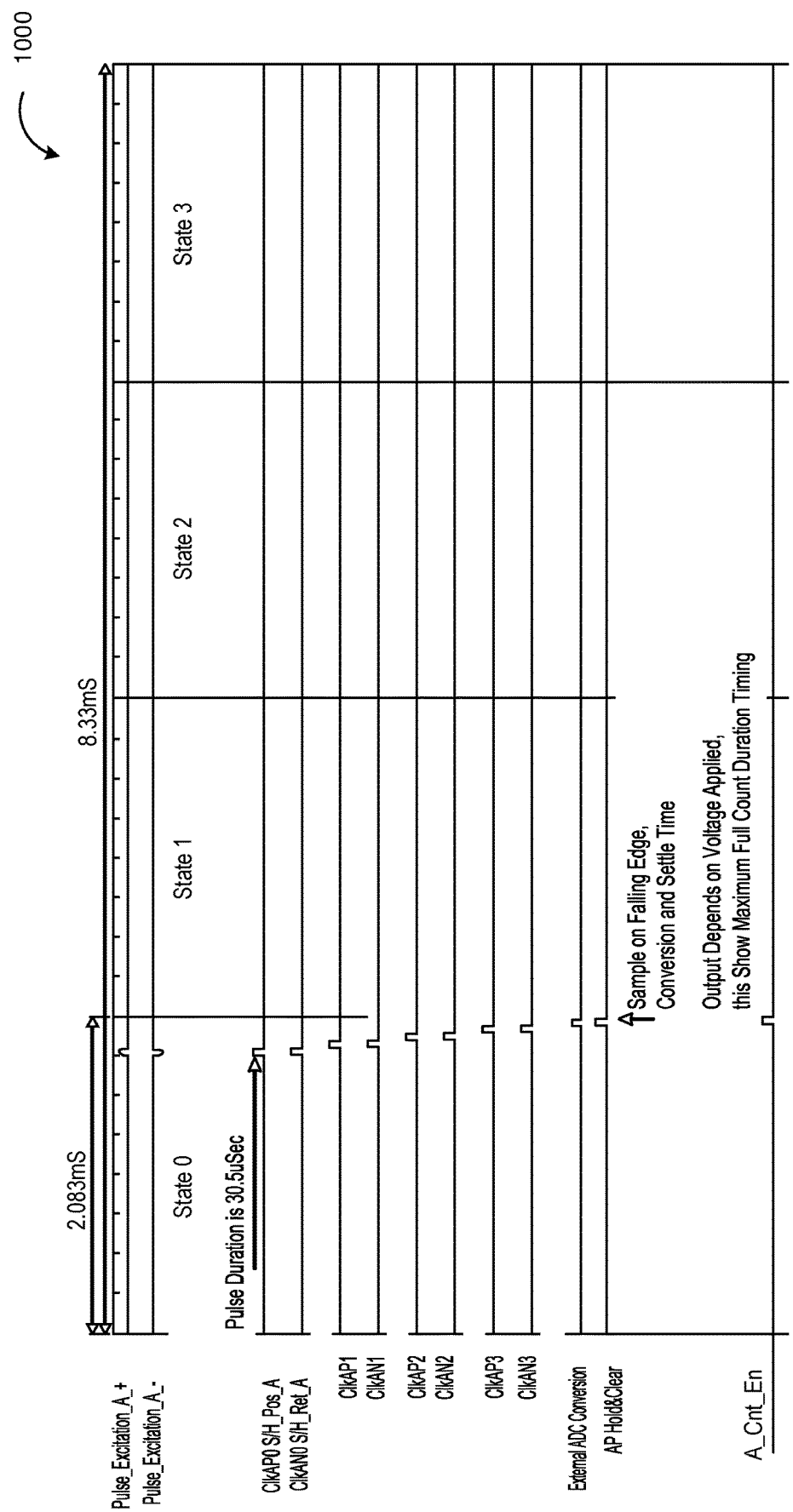
FIG. 10 illustrates a timing diagram for pulsing methodologies that may be implemented in the context of an integrated circuit, in accordance with one or more example embodiments of the present disclosure.

FIG. 10 illustrates a timing diagram 1000 for pulsing methodologies that may be implemented in the context of an integrated circuit, in accordance with one or more example embodiments of the present disclosure.

In various embodiments, the timing diagram depicted in FIG. 3 depicts waveforms that may be produced as part of pulsing methodologies described herein. The waveforms may be applicable to various embodiments, including those implemented using full-bridge load cell and half-bridge load cell architectures.

Turning to FIG. 10, within the waveforms depicted in diagram 1000, each of the sections may be sampled at 120 hz, with a full window of $1/120$=8.333 msec. The window may be divided into four equal portions of approximately 2.083 msec, with one portion of the window for each of four load cells. For example, the window portion for "State 0" may be used by a first load cell, the window portion for "State 1" may be used by a second load cell, the window portion for "State 2" may be used by a third load cell, and the window portion for "State 3" may be used by a fourth load cell. While the timing for one load cell is depicted in FIG. 10, these techniques may be similarly applied to other load cells in other time windows. In various embodiments, the active duty cycle of the load cell is approximately 30.5 microseconds. The duty cycle may be determined based on the microcontroller that is used and selection of a suitable frequency. For example, a microcontroller may operate at various power modes. The lowest power mode may be preferably selected, although other configurations are also possible. For example, a microcontroller with a 32.768 KHz crystal may be used.

In various embodiments, pulses of a short duration—for example, 30.5 microseconds, are used to drive the various clock components of an integrated circuit. For example, pulses may be provided for ClkAP0 and ClkAN0 to drive a first pair of sample and hold circuits. After pulsing for the first pair, a subsequent pulse may be provided for ClkAP1 and ClkAN1 to drive a second pair of sample and hold circuits. After pulsing the second pair, a subsequent pulse may be provided for ClkAP2 and ClkAN2 to drive a third pair of sample and hold circuits. After pulsing the third pair, a subsequent pulse may be provided for ClkAP3 and ClkAN3 to drive a fourth pair of sample and hold circuits. Subsequently, a pulse may be provided for external ADC conversion and AP hold and clear. The circuit may sample on the falling edge, conversion and settle time. The output of A_Cnt_En may depend on the voltage applied, with FIG. 10 depicting the maximum full count duration timing.

Figure 11:
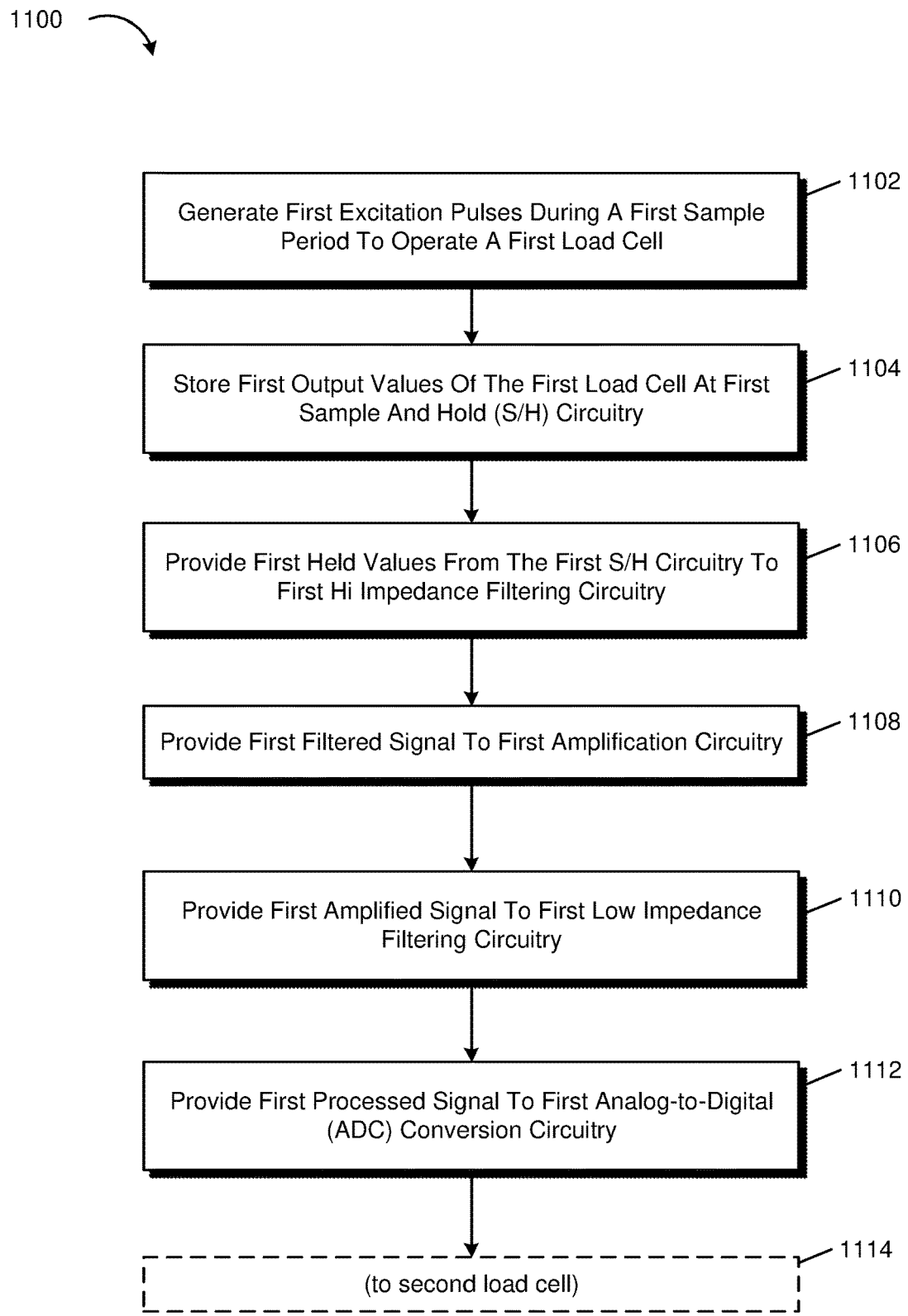
FIG. 11 shows an illustrative example of a process for pulsing methodologies in strain gauges, in accordance with one or more example embodiments of the present disclosure.

FIG. 11 shows an illustrative example of a process 1100 for pulsing methodologies in strain gauges, in accordance with one or more example embodiments of the present disclosure. In at least one embodiment, some or all of the process 1100 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 1100 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 1100 may be implemented in the context of various systems and methods described elsewhere in this disclosure, such as those discussed in connection with FIGS. 1 and 14. In at least one embodiment, process 1100 or a portion thereof is implemented by circuitry described in connection with FIG. 1 or FIG. 4, for example.

In at least some embodiments, process 11 comprises a step 1102 to generate first excitation pulses during a first state period to operate a first load cell. The first load cell may refer to a full-bridge load cell. In various embodiments, the pulses are generated using a LC waveshaping circuitry. In various embodiments, the pulses are on the order of less than 50 microseconds. For example, sampling at 120 hertz a full window of $1/120 = 8.333$ milliseconds. The window may be divided into four equal state periods of approximately 2.083 milliseconds, with one portion of the window for each of the four load cells (e.g., as depicted in FIG. 3). In various embodiments, the active duty cycle of the load cell is determined based on the microcontroller that is used. For example, a microcontroller may operate at various power modes. The lowest power mode may be preferably selected, although other configurations are also possible. For example, a microcontroller with a 32.768 KHz crystal may be capable of generating pulses that are on the order of 30.5 microseconds, or less than 50 microseconds.

In various embodiments, the load cells described herein may refer to full-bridge load cells (FBLCs) such as those described in connection with FIG. 1. In some embodiments, the load cells may refer to half-bridge load cells (HBLCs) such as those described in connection with FIG. 4. For example, four FBLCs may be placed at or near the corners of a platform or shelf to provide for weight measurements of items and track when items are picked from or placed on the platform or shelf. In various embodiments, FBLCs are arranged on a shelf or platform as depicted in FIG. 5. For example, eight HBLCs may be placed at the corners and midpoints of a shelf or platform, as depicted in FIG. 5

In at least some embodiments, process 11 comprises a step 1104 to store first output values of the first load cell at first sample and hold (S/H) circuitry. The S/H circuitry can be implemented in accordance with FIG. 1, for example.

In at least some embodiments, process 11 comprises a step 1106 to provide first held values from the first S/H circuitry to first high impedance filtering circuitry. The first high impedance filtering circuitry may comprise passive components such as low pass and common mode filtering circuitry and/or power line rejection filtering circuitry. In various embodiments, the filtering circuitry comprises a notch filter and a third order low pass filter.

In at least some embodiments, process 11 comprises a step 1108 to provide first filtered signal to first amplification circuitry. The amplification system may produce amplified signals. In various embodiments, the amplification circuitry comprises a first operational amplifier that amplifies a hold pos signal and a second operational amplifier that amplifies a ret pos signal.

In at least some embodiments, process 11 comprises a step 1110 to provide first amplified signal to first low impedance filtering circuitry. The low impedance filtering circuitry may be used to reduce power line filtering. For example, 50 Hz and/or 60 Hz noise may be filtered out using a notch filter.

In at least some embodiments, process 11 comprises a step 1112 to provide first processed signal to first analog-to-digital (ADC) conversion circuitry. The resulting digital signal may be provided via wireless communications to an inventory management system.

In at least some embodiments, process 11 comprises additional steps to perform measurements using second, third, fourth, etc. weight sensor assemblies. For example, a second weight sensor assembly may comprise similar circuitry and perform similar steps as described in connection with steps 1102 to 11012, as represented by numeral 1114 in FIG. 11.

Figure 12:
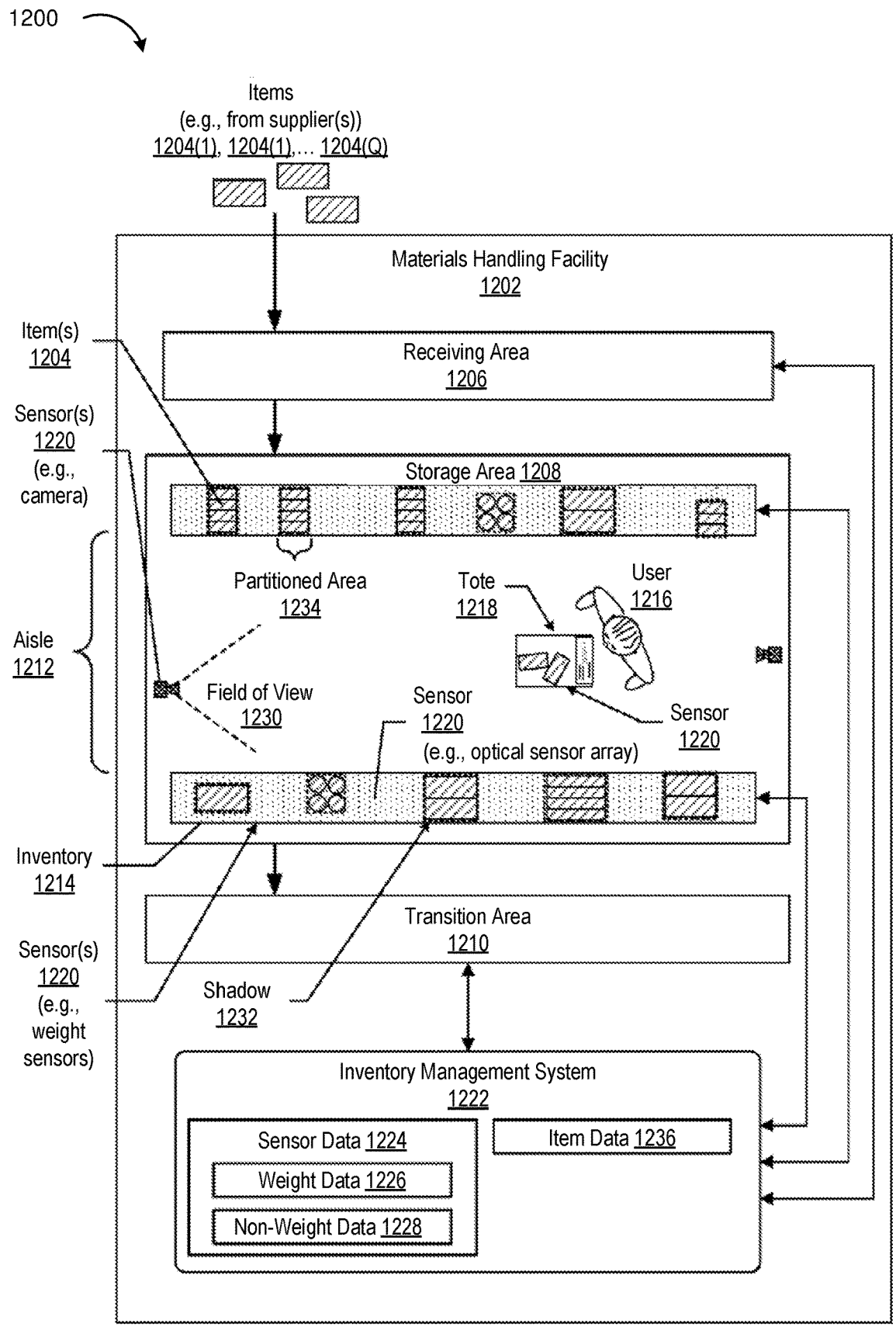
FIG. 12 illustrates a material handling system configured to store and manage inventory items, in accordance with one or more example embodiments of the present disclosure.

An implementation of a material handling system 1200 configured to store and manage inventory items is illustrated in FIG. 12. A material handling facility 1202 (facility) comprises one or more physical structures or areas within which one or more items 1204(1), 1204(2), . . . , 1204(Q) may be held. As used in this disclosure, letters in parenthesis such as "(Q)" indicate an integer value greater than or equal to zero. The items 1204 comprise physical goods, such as books, pharmaceuticals, repair parts, electronic gear, and so forth.

The facility 1202 may include one or more areas designated for different functions with regard to inventory handling. In this illustration, the facility 1202 includes a receiving area 1206, a storage area 1208, and a transition area 1210.

The receiving area 1206 may be configured to accept items 1204, such as from suppliers, for intake into the facility 1202. For example, the receiving area 1206 may include a loading dock at which trucks or other freight conveyances unload the items 1204.

The storage area 1208 is configured to store the items 1204. The storage area 1208 may be arranged in various physical configurations. In one implementation, the storage area 1208 may include one or more aisles 1212. The aisle 1212 may be configured with, or defined by, inventory locations 1214 on one or both sides of the aisle 1212. The inventory locations 1214 may include one or more of shelves, racks, cases, cabinets, bins, floor locations, or other suitable storage mechanisms for holding, supporting, or storing the items 1204. The inventory locations 1214 may be affixed to the floor or another portion of the facility's 1202 structure. The inventory locations 1214 may also be movable such that the arrangements of aisles 1212 may be reconfigurable. In some implementations, the inventory locations 1214 may be configured to move independently of an outside operator. For example, the inventory locations 1214 may comprise a rack with a power source and a motor, operable by a computing device to allow the rack to move from one location within the facility 1202 to another.

One or more users 1216(1), 1216(2), . . . , 1216(U) and totes 1218(1), 1218(2), . . . , 1218(T) or other material handling apparatuses may move within the facility 1202. For example, the user 1216 may move about within the facility 1202 to pick or place the items 1204 at various inventory locations 1214. For ease of transport, the items 1204 may be carried by the tote 1218. The tote 1218 is configured to carry or otherwise transport one or more items 1204. For example, the tote 1218 may include a basket, cart, bag, bin, and so forth. In other implementations, other material handling apparatuses such as robots, forklifts, cranes, aerial drones, and so forth, may move about the facility 1202 picking, placing, or otherwise moving the items 1204. For example, a robot may pick an item 1204 from a first inventory location 1214(1) and move the item 1204 to a second inventory location 1214(2). In some implementations, at least a portion of the tote 1218 may be designated as an inventory location 1214 and may be equipped as described herein with weight sensors.

One or more sensors 1220 may be configured to acquire information about events at the facility 1202. The sensors 1220 may include, but are not limited to, cameras, three-dimensional (3D) sensors, weight sensors, optical sensor arrays, proximity sensors, and so forth. The sensors 1220 may be stationary or mobile, relative to the facility 1202. For example, the inventory locations 1214 may contain weight sensors 1220(6) to acquire weight data of items 1204 stowed therein, cameras to acquire images of picking or placement of items 1204 on shelves, optical sensor arrays to detect shadows of the user's 1216 hands at the inventory locations 1214, and so forth. In another example, the facility 1202 may include cameras to obtain images of the user 1216 or other objects in the facility 1202. The sensors 1220 are discussed in more detail below with regard to FIG. 13.

While the storage area 1208 is depicted as having one or more aisles 1212, inventory locations 1214 storing the items 1204, sensors 1220, and so forth, it is understood that the receiving area 1206, the transition area 1210, or other areas of the facility 1202 may be similarly equipped. Furthermore, the arrangement of the various areas within the facility 1202 is depicted functionally rather than schematically. For example, in some implementations, multiple different receiving areas 1206, storage areas 1208, and transition areas 1210 may be interspersed rather than segregated in the facility 1202.

The facility 1202 may include, or be coupled to, an inventory management system 1222. The inventory management system 1222 is configured to interact with users 1216 or devices such as sensors 1220, robots, material handling equipment, computing devices, and so forth, in one or more of the receiving area 1206, the storage area 1208, or the transition area 1210.

During operation of the facility 1202, the sensors 1220 may be configured to provide sensor data 1224, or information based on the sensor data 1224, to the inventory management system 1222. The sensor data 1224 may include weight data 1226 obtained from weight sensors 1220(6), non-weight data 1228 obtained from other sensors 1220 such as cameras 1220(1), 3D sensors 1220(2), optical sensor arrays 1220(13), proximity sensors 1220(14), light curtains, and so forth. The sensors 1220 are described in more detail below.

The weight data 1226 comprises data generated by one or more weight sensors 1220(6) configured to measure the weight of an inventory location 1214 that may stow the items 1204. For example, the weight sensor 1220(6) may comprise a load cell beneath a load that may include a shelf or platform of the inventory location 1214. By reading one or more characteristics of the load cell, the weight of the load may be determined.

The non-weight data 1228 may comprise data generated by the non-weight sensors 1220, such as cameras 1220(1), 3D sensors 1220(2), buttons 1220(3), touch sensors 1220(4), microphones 1220(5), optical sensors 1220(7), RFID readers 1220(8), RF receivers 1220(9), accelerometers 1220(10), gyroscopes 1220(11), magnetometers 1220(12), optical sensor arrays 1220(13), proximity sensors 1220(14), and so forth. For example, cameras 1220(1) may be arranged to have a field of view (FOV) 1230 that includes at least a portion of the inventory location 1214. Continuing the example, the camera 1220(1) may be mounted above the inventory location 1214 with the FOV 1230 oriented to where the items 1204 may be stowed during use.

The inventory management system 1222 or other systems may use the sensor data 1224 to track the location of objects within the facility 1202, movement of the objects, or provide other functionality. Objects may include, but are not limited to, items 1204, users 1216, totes 1218, and so forth. For example, a series of images acquired by the camera 1220(1) may indicate removal by the user 1216 of an item 1204 from a particular location on the inventory location 1214 and placement of the item 1204 on or at least partially within the tote 1218.

The facility 1202 may be configured to receive different kinds of items 1204 from various suppliers and to store them until a customer orders or retrieves one or more of the items 1204. A general flow of items 1204 through the facility 1202 is indicated by the arrows of FIG. 12. Specifically, as illustrated in this example, items 1204 may be received from one or more suppliers, such as manufacturers, distributors, wholesalers, and so forth, at the receiving area 1206. In various implementations, the items 1204 may include merchandise, commodities, perishables, or any suitable type of item 1204, depending on the nature of the enterprise that operates the facility 1202.

Upon being received from a supplier at the receiving area 1206, the items 1204 may be prepared for storage in the storage area 1208. For example, in some implementations, items 1204 may be unpacked or otherwise rearranged. The inventory management system 1222 may include one or more software applications executing on a computer system to provide inventory management functions. These inventory management functions may include maintaining information indicative of the type, quantity, condition, cost, location, weight, or any other suitable parameters with respect to the items 1204. The items 1204 may be stocked, managed, or dispensed in terms of countable units, individual units, or multiple units, such as packages, cartons, crates, pallets, or other suitable aggregations. Alternatively, some items 1204, such as bulk products, commodities, and so forth, may be stored in continuous or arbitrarily divisible amounts that may not be inherently organized into countable units. Such items 1204 may be managed in terms of measurable quantity such as units of length, area, volume, weight, time, duration, or other dimensional properties characterized by units of measurement. Generally speaking, a quantity of an item 1204 may refer to either a countable number of individual or aggregate units of an item 1204 or a measurable amount of an item 1204, as appropriate.

After arriving through the receiving area 1206, items 1204 may be stored within the storage area 1208. In some implementations, like items 1204 may be stored or displayed together in the inventory locations 1214 such as in bins, on shelves, hanging from pegboards, and so forth. In this implementation, all items 1204 of a given kind are stored in one inventory location 1214. In other implementations, like items 1204 may be stored in different inventory locations 1214. For example, to optimize retrieval of certain items 1204 having frequent turnover within a large physical facility 1202, those items 1204 may be stored in several different inventory locations 1214 to reduce congestion that might occur at a single inventory location 1214.

When a customer order specifying one or more items 1204 is received, or as a user 1216 progresses through the facility 1202, the corresponding items 1204 may be selected or "picked" from the inventory locations 1214 containing those items 1204. In various implementations, item picking may range from manual to completely automated picking. For example, in one implementation, a user 1216 may have a list of items 1204 they desire and may progress through the facility 1202 picking items 1204 from inventory locations 1214 within the storage area 1208, and placing those items 1204 into a tote 1218. In other implementations, employees of the facility 1202 may pick items 1204 using written or electronic pick lists derived from customer orders. These picked items 1204 may be placed into the tote 1218 as the employee progresses through the facility 1202.

After items 1204 have been picked, they may be processed at a transition area 1210. The transition area 1210 may be any designated area within the facility 1202 where items 1204 are transitioned from one location to another or from one entity to another. For example, the transition area 1210 may be a packing station within the facility 1202. When the item 1204 arrives at the transition area 1210, the item 1204 may be transitioned from the storage area 1208 to the packing station. Information about the transition may be maintained by the inventory management system 1222.

In another example, if the items 1204 are departing the facility 1202, a list of the items 1204 may be obtained and used by the inventory management system 1222 to transition responsibility for, or custody of, the items 1204 from the facility 1202 to another entity. For example, a carrier may accept the items 1204 for transport with that carrier accepting responsibility for the items 1204 indicated in the list. In another example, a user 1216 may purchase or rent the items 1204 and remove the items 1204 from the facility 1202. During use of the facility 1202, the user 1216 may move about the facility 1202 to perform various tasks, such as picking or placing the items 1204 in the inventory locations 1214.

Objects such as an item 1204, hand, robotic manipulator, retrieval tool, and so forth, may exhibit a shadow 1232 with respect to the optical sensor array 1220(13) at an inventory location 1214. The shadow 1232 is illustrated with a dotted line in this figure. In one implementation, the optical sensor array 1220(13) may be located below the item 1204, such as within a shelf upon or above which the item 1204 is supported. The shadow 1232 may be cast upon the optical sensor array 1220(13). For example, where the optical sensor array 1220(13) is on a vertical wall behind the items 1204, the shadow 1232 may comprise the shadow 1232 cast on that wall.

The optical sensor array 1220(13) may comprise one or more sensors 1220, such as optical sensors 1220(7). The optical sensors 1220(7) may be arranged in a regular, repeating, or periodic two-dimensional arrangement such as a grid. Each of the optical sensors 1220(7) may be configured to provide output indicative of a light intensity value. For example, the optical sensors 1220(7) may generate an 8-bit value indicative of an intensity of light ranging from value 255 indicating maximum intensity to value 0 indicating minimum intensity. In another implementation, the light intensity value may be a 1-bit value of 0 or 1.

A single optical sensor array 1220(13) may be associated with several different items 1204. For example, the inventory location 1214 may comprise a shelf that includes an optical sensor array 1220(13). The shelf may have sufficient space to allow for storage of several different kinds of items 1204. Items 1204 may be grouped together and placed within a partitioned area 1234. The partitioned area 1234 may comprise a lane or row of identical items 1204 positioned one in front of another. For example, a left half of the shelf may store a first kind of item 1204(1), while a right half of the shelf may store a second kind of item 1204(2). The inventory management system 1222 may be configured to access partition data indicative of which portion of the optical sensor array 1220(13), or an output thereof, is associated with a particular item 1204.

The optical sensor array 1220(13) may generate non-weight data 1228 such as image data. The image data may comprise a plurality of pixels. Each pixel may correspond to a position within the two-dimensional arrangement of the optical sensors 1220(7) and comprises the light intensity value from the optical sensor 1220(7) at the position. In some implementations, the image data may comprise data from a subset of the optical sensors 1220(7) within the optical sensor array 1220(13). For example, the image data may comprise information from the optical sensors 1220(7) corresponding to a particular partitioned area 1234. In another example, image data from an optical sensor array 1220(13) having a plurality of partitioned areas 1234 may be segmented into the respective partitioned areas 1234 for further processing.

The inventory management system 1222 is configured to use the sensor data 1224 and item data 1236 to generate interaction data. The item data 1236 may include information about the item 1204, such as weight, appearance, where the item 1204 is stowed, and so forth. The interaction data may provide information about an interaction, such as a pick of an item 1204 from the inventory location 1214, a place of an item 1204 to the inventory location 1214, a touch made to an item 1204 at the inventory location 1214, a gesture associated with an item 1204 at the inventory location 1214, and so forth. For example, the gesture may include the user 1216 reaching towards the item 1204 held by the inventory location 1214.

The interaction data may include one or more of the type of interaction, partitioned area 1234 involved, item identifier, quantity change to the item 1204, user identifier, and so forth. The interaction data may then be used to further update the item data 1236. For example, the quantity of items 1204 on hand at a particular partitioned area 1234 may be changed based on an interaction that picks or places one or more items 1204.

The inventory management system 1222 may use the sensor data 1224 to determine the interaction. Weight characteristics about an interaction may be determined using the weight data 1226. These weight characteristics may include weight before an interaction, weight after an interaction, amount of change in the weight of the inventory location 1214, weight distribution of the inventory location 1214 at the weight sensors 1220(6), a change in the weight distribution of the inventory location 1214, and so forth. For example, an inventory location 1214 may stow a single type of item 1204. A count of the quantity of items 1204 picked or placed may be determined by dividing the change in weight associated with an interaction by the weight of a single item 1204 as stored in the item data 1236.

In some implementations, a single inventory location 1214 may stow several different types of items 1204, such as arranged in different partitioned areas 1234 as described above. The inventory management system 1222 may use the weight data 1226 to determine weight characteristics, and use those weight characteristics to identify the item 1204 that was picked or placed. For example, a change in the weight distribution, direction and distance of a change in the center-of-mass weight, and so forth, may be indicative of a pick or place of an item 1204 from a particular partitioned area 1234. The inventory management system 1222 may also use the weight data 1226 to determine the quantity picked or placed during an interaction, such as described above. However, in some situations, the same set of weight characteristics may correspond to several possible hypotheses. For example, given cans of approximately equal weight, placement of two cans of pet food at a first distance from an origin may result in the same weight distribution as a placement of one can at twice that distance from the origin.

The inventory management system 1222 may use non-weight data 1228, such as image data, to determine other information about the interaction. For example, the image data may be used to determine if motion is present at the inventory location 1214, if the appearance of the inventory location 1214 has changed indicative of whether an item 1204 has been added or removed, to determine a count of items at the inventory location 1214, and so forth.

Hypotheses based on this image data may be generated. For example, the hypotheses may indicate predicted item identifiers and a probability that the predicted item identifier is associated with the interaction. In another example, the hypotheses may indicate a predicted item quantity of the interaction and a probability that the predicted item quantity is associated with the interaction.

The inventory management system 1222 may be configured to generate, access, or otherwise determine hypotheses having predicted characteristics that correspond to measured characteristics observed in the sensor data 1224. Based on the probabilities associated with the hypotheses, a particular hypothesis may be designated a solution, and the predicted values of that hypothesis may be deemed to reflect the actual interaction.

In some implementations, items 1204 may be processed, such as at the receiving area 1206, to generate at least a portion of the item data 1236. For example, an item 1204 not previously stored by the inventory management system 1222 may be photographed by the camera 1220(1), weighed, placed on an optical sensor array 1220(13) and data about a shadow 1232 generated, and so forth. Continuing the example, the item data 1236 generated may include the weight of a single item 1204, a center-of-mass of the single item 1204, an area of the shadow 1232, appearance of the item 1204, absorption threshold comprising data indicative of transparency of the item 1204, and so forth.

During configuration of the system 1200, the weight distribution of a fully laden inventory location 1214 may be stored, as well as the weight distribution of an inventory location 1214 that is empty of items 1204.

By using the sensor data 1224, the inventory management system 1222 is able to maintain item data 1236 such as inventory levels of a particular item 1204 at a particular inventory location 1214, generate billing information without manual intervention by a user 1216, or provide other functions. For example, the user 1216 may pick an item 1204 from the inventory location 1214. Using the interaction data based on the sensor data 1224 and in conjunction with the item data 1236, the inventory management system 1222 may correctly determine that a quantity of two cans of dog food have been picked and bill the user 1216 accordingly for the sale price of the item 1204.

Figure 13:
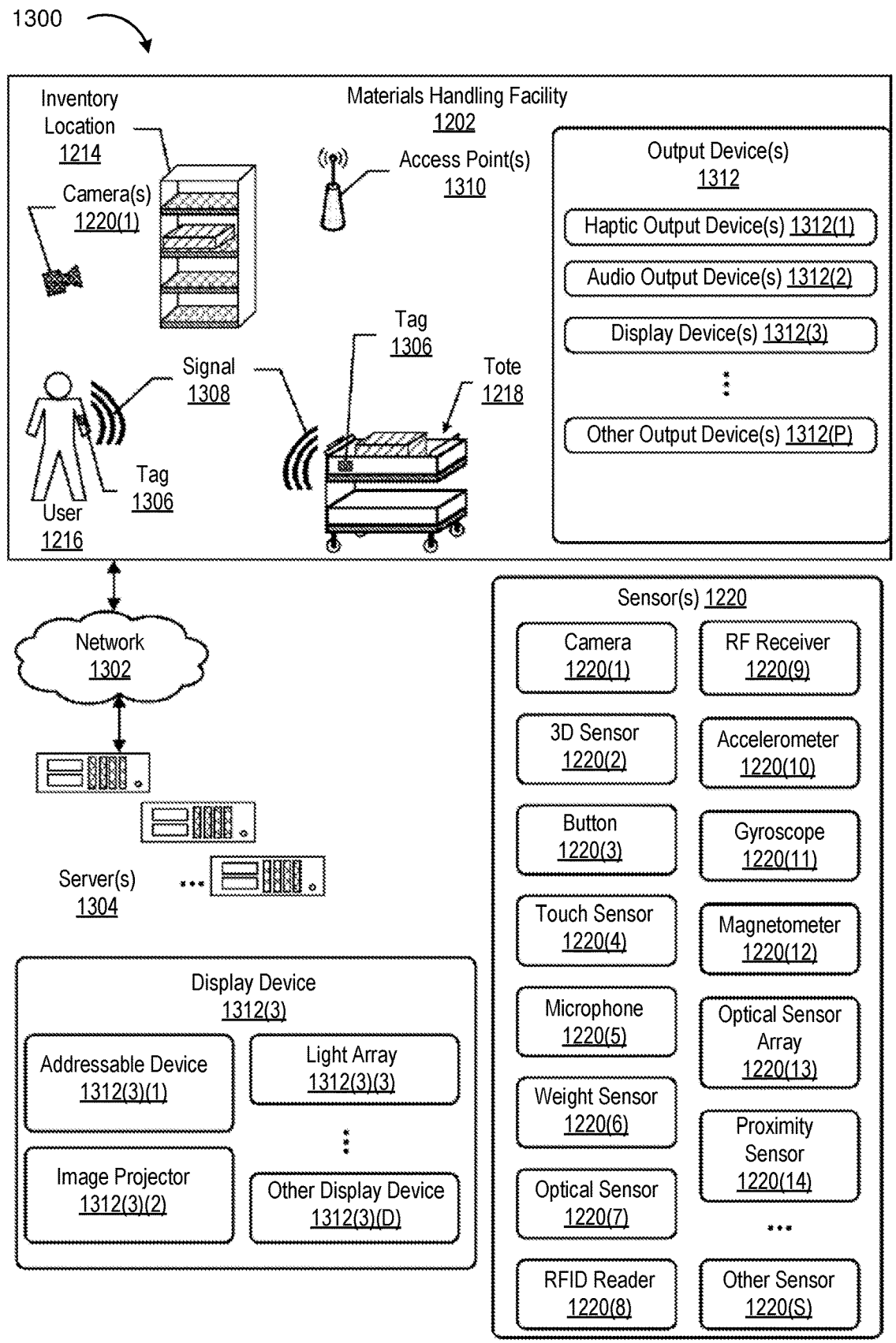
FIG. 13 is a block diagram illustrating additional details of a materials handling facility, in accordance with one or more example embodiments of the present disclosure.

FIG. 13 is a block diagram 1300 illustrating additional details of the facility 1202, according to some implementations. The facility 1202 may be connected to one or more networks 1302, which in turn connect to one or more servers 1304. The network 1302 may include private networks such as an institutional or personal intranet, public networks such as the Internet, or a combination thereof. The network 1302 may utilize wired technologies (e.g., wires, fiber optic cables, and so forth), wireless technologies (e.g., radio frequency, infrared, acoustic, optical, and so forth), or other connection technologies. The network 1302 is representative of any type of communication network, including one or more of data networks or voice networks. The network 1302 may be implemented using wired infrastructure (e.g., copper cable, fiber optic cable, and so forth), a wireless infrastructure (e.g., cellular, microwave, satellite, and so forth), or other connection technologies.

The servers 1304 may be configured to execute one or more modules or software applications associated with the inventory management system 1222, and so forth. While the servers 1304 are illustrated as being in a location outside of the facility 1202, in other implementations, at least a portion of the servers 1304 may be located at the facility 1202. The servers 1304 are discussed in more detail below with regard to FIG. 3.

The users 1216, the totes 1218, or other objects in the facility 1202 may be equipped with one or more tags 1306. The tags 1306 may be configured to emit a signal 1308. In one implementation, the tag 1306 may be a radio frequency identification (RFID) tag configured to emit a RF signal 1308 upon activation by an external signal. For example, the external signal may comprise a radio frequency signal or a magnetic field configured to energize or activate the RFID tag 1306. In another implementation, the tag 1306 may comprise a transmitter and a power source configured to power the transmitter. For example, the tag 1306 may comprise a Bluetooth Low Energy (BLE) transmitter and battery. In other implementations, the tag 1306 may use other techniques to indicate presence of the tag 1306. For example, an acoustic tag 1306 may be configured to generate an ultrasonic signal 1308, which is detected by corresponding acoustic receivers. In yet another implementation, the tag 1306 may be configured to emit an optical signal 1308.

The inventory management system 1222 may be configured to use the tags 1306 for one or more of identification of the object, determining a location of the object, and so forth. For example, the users 1216 may wear tags 1306, the totes 1218 may have tags 1306 affixed, and so forth, which may be read and, based at least in part on signal strength, used to determine identity and location.

Generally, the inventory management system 1222 or other systems associated with the facility 1202 may include any number and combination of input components, output components, and servers 1304.

The one or more sensors 1220 may be arranged at one or more locations within the facility 1202, on the exterior of the facility 1202, and so forth. For example, the sensors 1220 may be mounted on or within a floor, wall, at a ceiling, at an inventory location 1214, on a tote 1218, may be carried or worn by a user 1216, and so forth.

The sensors 1220 may include one or more cameras 1220(1) or other imaging sensors. The one or more cameras 1220(1) may include imaging sensors configured to acquire images of a scene. The cameras 1220(1) are configured to detect light in one or more wavelengths including, but not limited to, terahertz, infrared, visible, ultraviolet, and so forth. The cameras 1220(1) may comprise charge coupled devices (CCD), complementary metal oxide semiconductor (CMOS) devices, microbolometers, and so forth. The inventory management system 1222 may use image data acquired by the cameras 1220(1) during operation of the facility 1202. For example, the inventory management system 1222 may identify items 1204, users 1216, totes 1218, and so forth, based at least in part on their appearance within the image data acquired by the cameras 1220(1). The cameras 1220(1) may be mounted in various locations within the facility 1202. For example, cameras 1220(1) may be mounted overhead, on inventory locations 1214, may be worn or carried by users 1216, may be affixed to totes 1218, and so forth.

One or more 3D sensors 1220(2) may also be included in the sensors 1220. The 3D sensors 1220(2) are configured to acquire spatial or 3D data, such as depth information, about objects within a FOV 1230 of a sensor 1220. The 3D sensors 1220(2) may include range cameras, lidar systems, sonar systems, radar systems, structured light systems, stereo vision systems, optical interferometry systems, and so forth. The inventory management system 1222 may use the 3D data acquired by the 3D sensors 1220(2) to identify objects, determine a location of an object in 3D real space, and so forth.

One or more buttons 1220(3) may be configured to accept input from the user 1216. The buttons 1220(3) may comprise mechanical, capacitive, optical, or other mechanisms. For example, the buttons 1220(3) may comprise mechanical switches configured to accept an applied force from a touch of the user 1216 to generate an input signal. The inventory management system 1222 may use data from the buttons 1220(3) to receive information from the user 1216. For example, the tote 1218 may be configured with a button 1220(3) to accept input from the user 1216 and send information indicative of the input to the inventory management system 1222.

The sensors 1220 may include one or more touch sensors 1220(4). The touch sensors 1220(4) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The location within the material of that change in electrical resistance may indicate the position of the touch. The inventory management system 1222 may use data from the touch sensors 1220(4) to receive information from the user 1216. For example, the touch sensor 1220(4) may be integrated with the tote 1218 to provide a touchscreen with which the user 1216 may select from a menu one or more particular items 1204 for picking, enter a manual count of items 1204 at an inventory location 1214, and so forth.

One or more microphones 1220(5) may be configured to acquire information indicative of sound present in the environment. In some implementations, arrays of microphones 1220(5) may be used. These arrays may implement beamforming techniques to provide for directionality of gain. The inventory management system 1222 may use the one or more microphones 1220(5) to acquire information from acoustic tags 1306, accept voice input from the users 1216, determine the location of one or more users 1216 in the facility 1202, determine ambient noise level, and so forth.

One or more weight sensors 1220(6) are configured to measure the weight of a load, such as the item 1204, the user 1216, the tote 1218, and so forth. The weight sensors 1220(6) may be configured to measure the weight of the load at one or more of the inventory locations 1214, the tote 1218, on the floor of the facility 1202, and so forth. The weight sensors 1220(6) may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms of weight sensors 1220(6) may operate as transducers that generate one or more signals based on an applied force, such as that of the load due to gravity. For example, the weight sensor 1220(6) may comprise a load cell having a strain gauge and a structural member that deforms slightly when weight is applied. By measuring a change in the electrical characteristic of the strain gauge, such as capacitance or resistance, the weight may be determined. The inventory management system 1222 may use the data acquired by the weight sensors 1220(6) to identify an object, determine a change in the quantity of objects, determine a location of an object, maintain shipping records, and so forth.

The sensors 1220 may include one or more optical sensors 1220(7). The optical sensors 1220(7) may be configured to provide data indicative of one or more of color or intensity of light impinging thereupon. For example, the optical sensor 1220(7) may comprise a photodiode and associated circuitry configured to generate a signal or data indicative of an incident flux of photons. As described below, the optical sensor array 1220(13) may comprise a plurality of the optical sensors 1220(7). For example, the optical sensor 1220(7) may comprise an array of ambient light sensors such as the ISL76683 as provided by Intersil Corporation of Milpitas, Calif., USA, or the MAX44009 as provided by Maxim Integrated, Inc. of San Jose, Calif., USA. In other implementations, other optical sensors 1220(7) may be used. The optical sensors 1220(7) may be sensitive to one or more of infrared light, visible light, or ultraviolet light. For example, the optical sensors 1220(7) may be sensitive to infrared light, and infrared light sources such as LEDs may be used to provide illumination. The optical sensors 1220(7) may include photodiodes, photoresistors, photovoltaic cells, quantum dot photoconductors, bolometers, pyroelectric infrared detectors, and so forth. For example, the optical sensor 1220(7) may use germanium photodiodes to detect infrared light.

One or more radio frequency identification (RFID) readers 1220(8), near field communication (NFC) systems, and so forth, may be included as sensors 1220. For example, the RFID readers 1220(8) may be configured to read the RF tags 1306. Information acquired by the RFID readers 1220(8) may be used by the inventory management system 1222 to identify an object associated with the RF tag 1306 such as the item 1204, the user 1216, the tote 1218, and so forth. For example, based on information from the RFID readers 1220(8) detecting the RF tag 1306 at different times and RFID readers 1220(8) having different locations in the facility 1202, a velocity of the RF tag 1306 may be determined.

One or more RF receivers 1220(9) may also be included as sensors 1220. In some implementations, the RF receivers 1220(9) may be part of transceiver assemblies. The RF receivers 1220(9) may be configured to acquire RF signals 1308 associated with Wi-Fi, Bluetooth, ZigBee, 3G, 4G, LTE, or other wireless data transmission technologies. The RF receivers 1220(9) may provide information associated with data transmitted via radio frequencies, signal strength of RF signals 1308, and so forth. For example, information from the RF receivers 1220(9) may be used by the inventory management system 1222 to determine a location of an RF source, such as a communication interface onboard the tote 1218 or carried by the user 1216.

The sensors 1220 may include one or more accelerometers 1220(10), which may be worn or carried by the user 1216, mounted to the tote 1218, and so forth. The accelerometers 1220(10) may provide information such as the direction and magnitude of an imposed acceleration. Data such as rate of acceleration, determination of changes in direction, speed, and so forth, may be determined using the accelerometers 1220(10).

The sensors 1220 may also include one or more gyroscopes 1220(11). The gyroscope 1220(11) may provide information indicative of rotation of an object affixed thereto. For example, the tote 1218 or other objects may be equipped with a gyroscope 1220(11) to provide data indicative of a change in orientation of the object.

One or more magnetometers 1220(12) may be included as sensors 1220. The magnetometer 1220(12) may be used to determine an orientation by measuring ambient magnetic fields, such as the terrestrial magnetic field. The magnetometer 1220(12) may be worn or carried by the user 1216, mounted to the tote 1218, and so forth. For example, the magnetometer 1220(12) mounted to the tote 1218 may act as a compass and provide information indicative of which direction the tote 1218 is oriented.

As described above, the optical sensor array 1220(13) may comprise one or optical sensors 1220(7). The optical sensors 1220(7) may be arranged in a regular, repeating, or periodic two-dimensional arrangement such as a grid. The optical sensor array 1220(13) may generate image data.

The sensors 1220 may include proximity sensors 1220(14) used to determine a presence of an object, such as the user 1216, the tote 1218, and so forth. The proximity sensors 1220(14) may use optical, electrical, ultrasonic, electromagnetic, or other techniques to determine a presence of an object. In some implementations, the proximity sensors 1220(14) may use an optical emitter and an optical detector to determine proximity. For example, an optical emitter may emit light, a portion of which may then be reflected by the object back to the optical detector to provide an indication that the object is proximate to the proximity sensor 1220(14). In other implementations, the proximity sensors 1220(14) may comprise a capacitive proximity sensor 1220(14) configured to provide an electrical field and determine a change in electrical capacitance due to presence or absence of an object within the electrical field.

The proximity sensors 1220(14) may be configured to provide sensor data 1224 indicative of one or more of a presence or absence of an object, a distance to the object, or characteristics of the object. An optical proximity sensor 1220(14) may use time-of-flight (ToF), structured light, interferometry, or other techniques to generate sensor data 1224 such as distance. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using an imaging sensor such as a camera 1220(1). Based on an apparent distance between the features of the structured light pattern, the distance to the object may be calculated. Other techniques may also be used to determine distance to the object. In another example, the color of the reflected light may be used to characterize the object, such as skin, clothing, tote 1218, and so forth.

In some implementations, a proximity sensor 1220(14) may be installed at the inventory location 1214. The non-weight data 1228 generated by the proximity sensor 1220(14) may be used in conjunction with the weight data 1226 as described in this disclosure. For example, the optical proximity sensor 1220(14) may generate non-weight data 1228 indicative of the user 1216 being within a threshold distance of an inventory location 1214. Based on the non-weight data 1228, the inventory management system 1222 may generate activity data indicative of the presence of the user 1216. By using the activity data, the inventory management system 1222 may determine that the weight data 1226 is reliable and subsequently use changes in the weight data 1226 to change the item data 1236 indicative of a quantity on hand.

The sensors 1220 may include other sensors 1220(S) as well. For example, the other sensors 1220(S) may include light curtains, ultrasonic rangefinders, thermometers, barometric sensors, hygrometers, biometric input devices including, but not limited to, fingerprint readers or palm scanners, in-shelf sensors, and so forth. For example, the inventory management system 1222 may use information acquired from light curtains to determine where the user 1216 has reached into an inventory location 1214. The light curtain may comprise one or more pairs of optical emitters and detectors. An object, such as a hand of the user 1216, that blocks a beam of light sent from the optical emitter to the detector provides an indication of the location of the user's 1216 hand. In another example, in-shelf sensors may generate sensor data 1224 indicative of a position of an auto-facing unit, proximity of an item 1204 at the inventory location 1214, and so forth.

In some implementations, the camera 1220(1) or other sensors 1220 may include hardware processors, memory, and other elements configured to perform various functions. For example, the cameras 1220(1) may be configured to generate image data, send the image data to another device such as the server 204, and so forth.

The facility 1202 may include one or more access points 1310 configured to establish one or more wireless networks. The access points 1310 may use Wi-Fi, NFC, Bluetooth, or other technologies to establish wireless communications between a device and the network 1302. The wireless networks allow the devices to communicate with one or more of the sensors 1220, the inventory management system 1222, the optical sensor arrays 1220(13), the tag 1306, a communication device of the tote 1218, or other devices.

Output devices 1312 may also be provided in the facility 1202. The output devices 1312 are configured to generate signals, which may be perceived by the user 1216 or detected by the sensors 1220. In some implementations, the output devices 1312 may be used to provide illumination of the optical sensor array 1220(13).

Haptic output devices 1312(1) are configured to provide a signal that results in a tactile sensation to the user 1216. The haptic output devices 1312(1) may use one or more mechanisms such as electrical stimulation or mechanical displacement to provide the signal. For example, the haptic output devices 1312(1) may be configured to generate a modulated electrical signal, which produces an apparent tactile sensation in one or more fingers of the user 1216. In another example, the haptic output devices 1312(1) may comprise piezoelectric or rotary motor devices configured to provide a vibration, which may be felt by the user 1216.

One or more audio output devices 1312(2) may be configured to provide acoustic output. The acoustic output includes one or more of infrasonic sound, audible sound, or ultrasonic sound. The audio output devices 1312(2) may use one or more mechanisms to generate the acoustic output. These mechanisms may include, but are not limited to, the following: voice coils, piezoelectric elements, magnetorestrictive elements, electrostatic elements, and so forth. For example, a piezoelectric buzzer or a speaker may be used to provide acoustic output.

The display devices 1312(3) may be configured to provide output, which may be seen by the user 1216 or detected by a light-sensitive sensor such as a camera 1220(1) or an optical sensor 1220(7). In some implementations, the display devices 1312(3) may be configured to produce output in one or more of infrared, visible, or ultraviolet light. The output may be monochrome or color.

The display devices 1312(3) may be emissive, reflective, or both. An emissive display device 1312(3) is configured to emit light during operation. For example, the emissive display device 1312(3) may produce an image using LEDs. In comparison, a reflective display device 1312(3) relies on ambient light to present an image. For example, the reflective display device 1312(3) may use an electrophoretic element that emits no light. Backlights or front lights may be used to illuminate non-emissive display devices 1312(3) to provide visibility of the output in conditions where the ambient light levels are low.

The display devices 1312(3) may include, but are not limited to, microelectromechanical systems (MEMS), spatial light modulators, electroluminescent displays, quantum dot displays, liquid crystal on silicon (LCOS) displays, cholesteric displays, interferometric displays, liquid crystal displays (LCDs), electrophoretic displays, and so forth. For example, the display device 1312(3) may use a light source and an array of MEMS-controlled mirrors to selectively direct light from the light source to produce an image. These display mechanisms may be configured to emit light, modulate incident light emitted from another source, or both. The display devices 1312(3) may operate as panels, projectors, and so forth.

The display devices 1312(3) may be configured to present images. For example, the display device 1312(3) may comprise an addressable display 1312(3)(1). The addressable display 1312(3)(1) may comprise elements that may be independently addressable to produce output, such as pixels. For example, the addressable display 1312(3)(1) may produce an image using a two-dimensional array of pixels.

In some implementations, the display devices 1312(3) may be configured to provide non-image data, such as text characters, colors, and so forth. For example, an addressable display 1312(3)(1) may comprise a segmented electrophoretic display device 1312(3), segmented LED, and so forth. The addressable display 1312(3)(1) may be used to present information such as a stock keeping unit (SKU) number, quantity on hand, and so forth. The display devices 1312(3) may also be configurable to vary the color of the segment, such as using multicolor/multi-wavelength LED segments.

The display devices 1312(3) may include image projectors 1312(3)(2). For example, the image projector 1312(3)(2) may be configured to project an image onto objects, illuminate at least a portion of an optical sensor array 1220(13), and so forth. The image may be generated using MEMS, LCOS, lasers, and so forth.

The display devices 1312(3) may include a light array 1312(3)(3). The light array 1312(3)(3) may comprise a plurality of discrete emissive elements configurable to emit light. The discrete emissive elements (or assemblies thereof) may be separated from one another by a distance such that, when image data of the light array 1312(3)(3) is acquired, one emissive element may be distinguished from another. For example, the light array 1312(3)(3) may comprise a plurality of infrared LEDs separated by at least 0.5 centimeters.

Other display devices 1312(3)(D) may also be used in conjunction with the facility 1202. The display devices 1312(3) may be located at various points within the facility 1202. For example, the addressable displays 1312(3)(1) or the light arrays 1312(3)(3) may be located on inventory locations 1214, totes 1218, in or on the floor of the facility 1202, and so forth.

Other output devices 1312(P) may also be present. For example, the other output devices 1312(P) may include scent/odor dispensers, document printers, 3D printers or fabrication equipment, and so forth.

One or more operations of the methods, process flows, or use cases of FIGS. 1-14 may have been described above as being performed by a user device, or more specifically, by one or more program module(s), applications, or the like executing on a device. It should be appreciated, however, that any of the operations of the methods, process flows, or use cases of FIGS. 1-14 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-14 may be described in the context of the illustrative devices, it should be appreciated that such operations may be implemented in connection with numerous other device configurations.

The operations described and depicted in the illustrative methods, process flows, and use cases of FIGS. 1-14 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-14 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

The examples presented herein are not meant to be limiting.

Figure 14:
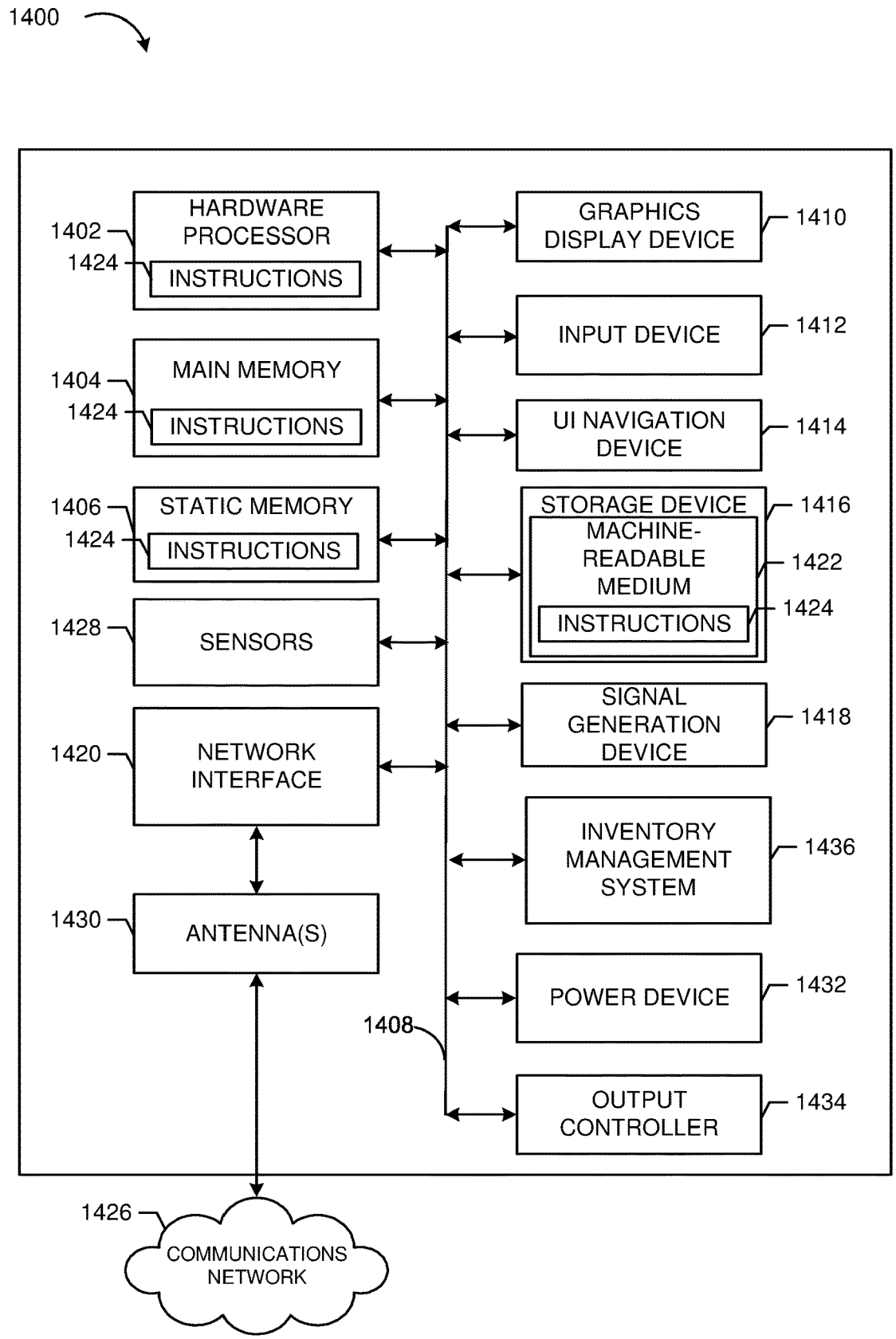
FIG. 14 illustrates a block diagram of an example machine upon which any of one or more techniques (e.g., methods) may be performed, in accordance with one or more example embodiments of the present disclosure.

FIG. 14 illustrates a block diagram of an example of a machine 1400 (e.g., implemented in whole or in part in the context of embodiments described in connection with other figures. In some embodiments, the machine 1400 may operate as a standalone device or may be connected (e.g., networked) to other machines. In a networked deployment, the machine 1400 may operate in the capacity of a server machine, a client machine, or both in server-client network environments. In an example, the machine 1400 may act as a peer machine in Wi-Fi direct, peer-to-peer (P2P) (or other distributed) network environments. The machine 1400 may be a wearable device or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1400 may include any combination of the illustrated components. For example, the machine 1400 may include a hardware processor 1402 (e.g., a central processing unit (CPU), a graphics processing unit (GPU), a hardware processor core, or any combination thereof), a main memory 1404 and a static memory 1406, some or all of which may communicate with each other via an interlink (e.g., bus) 1408. The machine 1400 may further include a power management device 1432, a graphics display device 1410, an alphanumeric input device 1412 (e.g., a keyboard), and a user interface (UI) navigation device 1414 (e.g., a mouse). In an example, the graphics display device 1410, alphanumeric input device 1412, and UI navigation device 1414 may be a touch screen display. The machine 1400 may additionally include a storage device (e.g., drive unit) 1416, a signal generation device 1418, and a network interface device/transceiver 1420 coupled to antenna(s) 1430. The machine 1400 may include an output controller 1434, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, other sensors, etc.)).

The storage device 1416 may include a machine readable medium 1422 on which is stored one or more sets of data structures or instructions 1424 (e.g., software) embodying or utilized by any one or more of the techniques or functions described herein. The instructions 1424 may also reside, completely or at least partially, within the main memory 1404, within the static memory 1406, or within the hardware processor 1402 during execution thereof by the machine 1400. In an example, one or any combination of the hardware processor 1402, the main memory 1404, the static memory 1406, or the storage device 1416 may constitute machine-readable media.

While the machine-readable medium 1422 is illustrated as a single medium, the term "machine-readable medium" may include a single medium or multiple media (e.g., a centralized or distributed database, and/or associated caches and servers) configured to store the one or more instructions 1424.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 1400 and that cause the machine 1400 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices;

magnetic disks, such as internal hard disks and removable disks; magneto-optical disks; and CD-ROM and DVD-ROM disks.

The instructions 1424 may further be transmitted or received over a communications network 1426 using a transmission medium via the network interface device/transceiver 1420 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1420 may include one or more physical jacks (e.g., Ethernet, coaxial, or phone jacks) or one or more antennas to connect to the communications network 1426. In an example, the network interface device/transceiver 1420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1400 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, bio-medical sensors, wearable devices or sensors, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which may be used to store the information and which may be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Additionally, features of various system and methods described herein that are implemented "by" or "based on" performing a step are to be construed or may be synonymous to "by at least" or "based at least in part on" performing said step rather than "by solely" or "based solely on" performing said step, unless it is explicitly stated or clear from the context. For example, a system that implements specific features "by" performing a particular step may be described in a manner that is not exclusive of the performance of other steps, some of which may be related to said particular step. In some cases, other steps may be omitted from various discussions for the sake of clarity.

What is claimed is:

1. An apparatus, comprising:
    a platform having a first corner, a second corner, a third corner, and a fourth corner;
    a first weight sensor assembly located at the first corner, comprising:
        first full-bridge load cell (FBLC) that receives first excitation pulses during a first state period of a duty cycle;
        first sample and hold (S/H) circuitry connected to the first FBLC that holds first analog measurement signals from the first FBLC;
        first filtering circuitry connected to the first S/H circuitry that processes the first analog measurement signals and produces a first DC level signal; and
        first amplification system connected to the first filtering circuitry that amplifies the first DC level signal;
    a second weight sensor assembly located at the second corner, comprising:
        second full-bridge load cell (FBLC) that receives second excitation pulses during a second state period of the duty cycle;
        second sample and hold (S/H) circuitry connected to the second FBLC that holds second analog measurement signals from the second FBLC;
        second filtering circuitry connected to the second S/H circuitry that processes the second analog measurement signals and produces a second DC level signal; and
        second amplification system connected to the second filtering circuitry that amplifies the second DC level signal;
    a third weight sensor assembly located at the third corner, comprising:
        third full-bridge load cell (FBLC) that receives third excitation pulses during a third state period of the duty cycle;
        third sample and hold (S/H) circuitry connected to the third FBLC that holds third analog measurement signals from the third FBLC;
        third filtering circuitry connected to the third S/H circuitry that processes the third analog measurement signals and produces a third DC level signal; and
        third amplification system connected to the third filtering circuitry that amplifies the third DC level signal; and
    a fourth weight sensor assembly located at the fourth corner, comprising:
        fourth full-bridge load cell (FBLC) that receives fourth excitation pulses during a fourth state period of the duty cycle;
        fourth sample and hold (S/H) circuitry connected to the fourth FBLC that holds fourth analog measurement signals from the fourth FBLC;
        fourth filtering circuitry connected to the fourth S/H circuitry that processes the fourth analog measurement signals and produces a fourth DC level signal; and
        fourth amplification system connected to the fourth filtering circuitry that amplifies the fourth DC level signal.

2. The apparatus of claim 1, wherein:
    the first weight sensor assembly further comprises first waveforming circuitry for producing the first excitation pulses.

3. The apparatus of claim 1, wherein the first excitation pulses are in the shape of a half-sine wave.

4. The apparatus of claim 1, wherein the first excitation pulses are pulsed for less than 1% of the duty cycle.

5. The apparatus of claim 4, wherein the first excitation pulses are less than 50 microseconds in duration.

6. The apparatus of claim 1, wherein the first weight sensor assembly further comprises:
    first low impedance notch filter connected to the first amplification system; and
    first analog-to-digital (ADC) circuitry connected to the first low impedance notch filter.

7. The apparatus of claim 1, wherein the first filtering circuitry comprises a notch filter and a third order low pass filter.

8. A weight sensor assembly, comprising:
    one or more load cells that receives excitation pulses during a first state period of a duty cycle;
    sample and hold (S/H) circuitry connected to the one or more load cells that holds analog measurement signals from the one or more load cells;
    first filtering circuitry connected to the S/H circuitry that processes the analog measurement signals and produces a DC level signal;
    an amplification system connected to the first filtering circuitry that amplifies the DC level signal;

second filtering circuitry connected to the amplification system that filters power line noise; and analog-to-digital (ADC) circuitry connected to the second filtering circuitry.

9. The weight sensor assembly of claim 8, wherein the one or more load cells comprises a pair of half-bridge load cells (HBLCs).

10. The weight sensor assembly of claim 9, wherein the pair of HBLCs are located at corners and/or midpoints of a shelf or platform.

11. The weight sensor assembly of claim 8, wherein the one or more load cells is a full-bridge load cell.

12. The weight sensor assembly of claim 8, wherein the excitation pulses are in the shape of a half-sine wave.

13. The weight sensor assembly of claim 8, wherein the excitation pulses are pulsed for less than 1% of the duty cycle.

14. The weight sensor assembly of claim 13, wherein:
the excitation pulses are less than 50 microseconds in duration; and
the duty cycle is approximately 8.3 milliseconds in duration.

15. The weight sensor assembly of claim 8, wherein the first filtering circuitry comprises a notch filter and a third order low pass filter.

* * * * *